(12) United States Patent
Tankovich et al.

(10) Patent No.: US 11,810,313 B2
(45) Date of Patent: Nov. 7, 2023

(54) REAL-TIME STEREO MATCHING USING A HIERARCHICAL ITERATIVE REFINEMENT NETWORK

(71) Applicant: GOOGLE LLC, Mountain View, CA (US)

(72) Inventors: Vladimir Tankovich, Seattle, WA (US); Christian Haene, Berkeley, CA (US); Sean Ryan Francesco Fanello, San Francisco, CA (US); Yinda Zhang, Daly City, CA (US); Shahram Izadi, Tiburon, CA (US); Sofien Bouaziz, Los Gatos, CA (US); Adarsh Prakash Murthy Kowdle, San Francisco, CA (US); Sameh Khamis, Oakland, CA (US)

(73) Assignee: GOOGLE LLC, Mountain View, CA (US)

( * ) Notice: Subject to any disclaimer, the term of this patent is extended or adjusted under 35 U.S.C. 154(b) by 205 days.

(21) Appl. No.: 17/249,095

(22) Filed: Feb. 19, 2021

(65) Prior Publication Data

US 2021/0264632 A1      Aug. 26, 2021

Related U.S. Application Data

(60) Provisional application No. 62/979,928, filed on Feb. 21, 2020.

(51) Int. Cl.
   *G06T 7/593*      (2017.01)
   *H04N 13/20*     (2018.01)
   (Continued)

(52) U.S. Cl.
   CPC ............ *G06T 7/593* (2017.01); *G06T 3/0093* (2013.01); *G06T 3/40* (2013.01); *G06T 5/30* (2013.01);
   (Continued)

(58) Field of Classification Search
   CPC ......... G06T 7/593; G06T 3/0093; G06T 3/40; G06T 5/30; G06T 2207/20016;
   (Continued)

(56) References Cited

U.S. PATENT DOCUMENTS 10,380,753 B1 *  8/2019  Csordás ................. G06V 10/82
10,554,957 B2    2/2020  Valentin et al.
(Continued)

FOREIGN PATENT DOCUMENTS

GB             2583774 A  * 11/2020  ............. G06T 7/593

OTHER PUBLICATIONS

Duggal, S., Wang, S., Ma, W.C., Hu, R. and Urtasun, R., 2019. Deeppruner: Learning efficient stereo matching via differentiable patchmatch. In Proceedings of the IEEE/CVF international conference on computer vision (pp. 4384-4393).*

Dovesi, P.L., Poggi, M., Andraghetti, L., Martí, M., Kjellström, H., Pieropan, A. and Mattoccia, S., May 2020. Real-time semantic stereo matching. In 2020 IEEE international conference on robotics and automation (ICRA) (pp. 10780-10787). IEEE.*

(Continued)

*Primary Examiner* — Zhitong Chen
(74) *Attorney, Agent, or Firm* — Brake Hughes Bellermann LLP

(57) ABSTRACT

According to an aspect, a real-time active stereo system includes a capture system configured to capture stereo data, where the stereo data includes a first input image and a second input image, and a depth sensing computing system configured to predict a depth map. The depth sensing computing system includes a feature extractor configured to extract features from the first and second images at a plurality of resolutions, an initialization engine configured to generate a plurality of depth estimations, where each of the plurality of depth estimations corresponds to a different resolution, and a propagation engine configured to iteratively refine the plurality of depth estimations based on image warping and spatial propagation.

21 Claims, 14 Drawing Sheets

(51) Int. Cl.
  *G06T 3/00* (2006.01)
  *G06T 3/40* (2006.01)
  *G06T 5/30* (2006.01)
  *H04N 13/00* (2018.01)

(52) U.S. Cl.
  CPC ... *H04N 13/20* (2018.05); *G06T 2207/20016* (2013.01); *G06T 2207/20084* (2013.01); *H04N 2013/0081* (2013.01)

(58) Field of Classification Search
  CPC .......... G06T 2207/20084; G06T 2207/10012; H04N 13/20; H04N 2013/0081
  See application file for complete search history.

(56) References Cited

U.S. PATENT DOCUMENTS

| | | |
|---|---|---|
| 10,839,539 B2 | 11/2020 | Kowdle et al. |
| 2018/0350087 A1 | 12/2018 | Kowdle et al. |
| 2019/0287259 A1 | 9/2019 | Tankovich et al. |
| 2021/0004979 A1 | 1/2021 | Valentin et al. |

OTHER PUBLICATIONS

Bleyer, M., Rhemann, C. and Rother, C., Aug. 2011. Patchmatch stereo-stereo matching with slanted support windows. In Bmvc (vol. 11, pp. 1-11) (Bleyer).*

International Search Report and Written Opinion for PCT Application No. PCT/US2021/070171, dated Jun. 4, 2021, 16 pages.

Dubbelman, et al., "Obstacle Detection During Day and Night Conditions Using Stereo Vision", Intelligent Robots and Systems, IROS, IEEE/RSJ International Conference ON, Oct. 29, 2007, 8 pages.

Sun, et al., "PWC-NET: CNNS for Optical Flow Using Pyramid, Warping, and Cost Volume", arXiv:1709.,02371v1, Sep. 7, 2017, 12 pages.

Tankovich, et al., "HITNET: Hierarchical Iterative Tile Refinement Network for Real-Time Stereo Matching", arXiv:2007.12140v2, Dec. 29, 2020, 17 pages.

Lee, et al., "Multi-Resolution Disparity Processing and Fusion for Large High-Resolution Stereo Image", IEEE Transaction on Multimedia, IEEE Service Center, US, vol. 17, No. 6, Jun. 1, 2015, 12 pages.

* cited by examiner

REAL-TIME STEREO MATCHING USING A HIERARCHICAL ITERATIVE REFINEMENT NETWORK

RELATED APPLICATION

This application claims priority to Provisional Patent Application No. 62/979,928, filed on Feb. 21, 2020, entitled "HITNET: HIERARCHICAL ITERATIVE TILE REFINEMENT NETWORK FOR REAL-TIME STEREO MATCHING", the contents of which are hereby incorporated by reference in its entirety.

TECHNICAL FIELD

Embodiments relate to real-time stereo matching using a hierarchical iterative refinement network to increase the speed, resolution and/or accuracy of depth maps.

BACKGROUND

Stereo matching, also known as stereo vision or disparity mapping, is a process to find the depth of a scene and involves capturing two images from different viewpoints and matching those images to locate disparities (e.g., differences in positions) of elements in the scene. Some conventional approaches use computationally expensive deep learning networks to improve the accuracy of depth maps (also referred to as disparity maps). However, large convolutional neural networks (CNNs) may require a relatively long process time to process an image pair and infer a disparity map. For some applications (e.g., mobile robots, self-driving vehicles), this relatively high latency may be undesirable.

SUMMARY

According to an aspect, a real-time active stereo system includes a capture system configured to capture stereo data, where the stereo data includes a first input image and a second input image, and a depth sensing computing system configured to predict a depth map. The depth sensing computing system includes a feature extractor configured to extract features from the first and second images at a plurality of resolutions, an initialization engine configured to generate a plurality of depth estimations, where each of the plurality of depth estimations corresponds to a different resolution, and a propagation engine configured to iteratively refine the plurality of depth estimations based on image warping and spatial propagation.

According to an aspect, a method for real-time stereo matching includes extracting, by a feature extractor, features from first and second images at a plurality of resolutions including a first resolution and a second resolution, and generating, by an initialization engine, a plurality of depth estimations at the plurality of resolutions, including predicting a first depth estimation based on a matching of the features from the first and second images at the first resolution, and predicting a second depth estimation based on a matching of the features from the first and second images at the second resolution. The method includes iteratively refining, by a propagation engine, the plurality of depth estimations based on image warping and spatial propagation, including predicting, via a first iteration, a refined first depth estimation using the first depth estimation and the extracted features at the first resolution, and predicting, via a second iteration, a refined second depth estimation based on the refined first depth estimation from the first iteration and the second depth estimation, where the refined second depth estimation is used in a subsequent iteration or as a basis for a depth map.

According to an aspect, a non-transitory computer-readable medium storing executable instructions that when executed by at least one processor cause the at least one processor to receive a first image captured from a first camera and a second image captured from a second camera, extract features from the first and second images at a plurality of resolutions including a first resolution and a second resolution, generate a plurality of depth estimations at the plurality of resolutions using the extracted features, the plurality of depth estimations including a first depth estimation and a second depth estimation, and iteratively refine the depth estimations based on image warping and spatial propagation, including predict, via a first iteration, a refined first depth estimation using the first depth estimation and the extracted features at the first resolution, and predict, via a second iteration, a refined second depth estimation based on the refined first depth estimation from the first iteration, and the second depth estimation, where the refined second depth estimation is used in a subsequent iteration or as a basis for a depth map. In some examples, the first depth estimation includes an initial disparity, a slanted plane, and a feature descriptor for each image region of the depth map.

DETAILED DESCRIPTION

Figure 1:
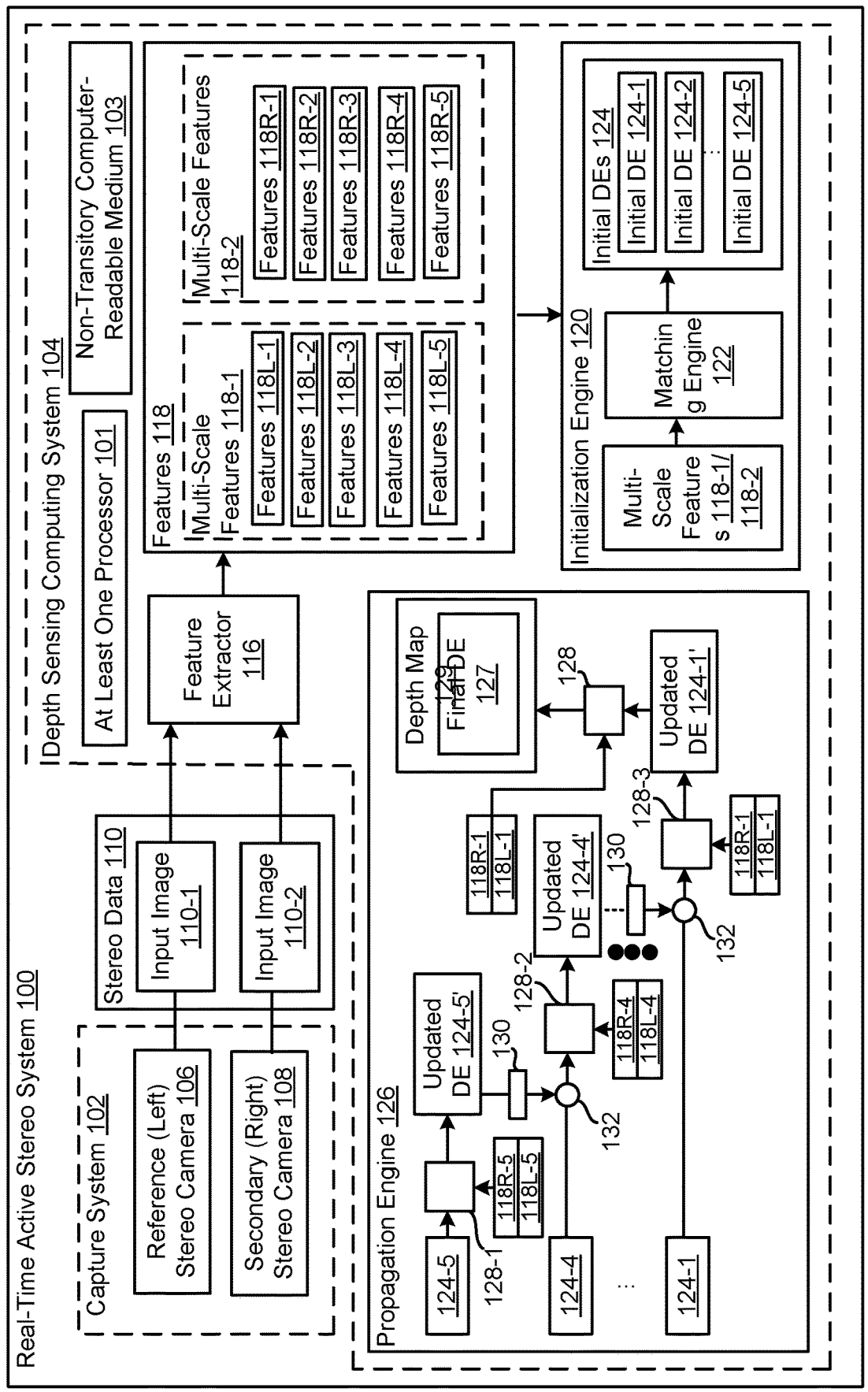
FIG. 1 illustrates a real-time active stereo system according to an aspect.

The embodiments discussed herein provide a real-time active stereo system configured to generate a depth map (also referred to as a disparity map) based on real-time stereo matching. The real-time active stereo system includes a capture system that captures stereo data (e.g., a pair of input images) and a depth sensing computing system that generates the depth map using the stereo data. The depth sensing computing system includes a feature extractor that extracts features at multiple resolutions using the pair of input images, and an initialization engine that implements an efficient initialization step that maintains high resolution in three dimensions, where the initialization step includes predicting initial depth estimations (e.g., disparity maps initialized as fronto-parallel regions (tiles) across the multiple resolutions) using the extracted multi-resolution features.

For example, the initial depth estimations may include a first initial depth estimation (e.g., a first initial depth map) according to a first resolution, a second initial depth estimation (e.g., a second initial depth map) according to a second resolution, and so forth. Each initial depth estimation is predicted based on a matching of the extracted features. For instance, the first initial depth estimation is predicted based on a matching of the first input image's features at the first resolution with the second input image's features at the first resolution, and the second initial depth estimation is predicted based on a matching of the first input image's features at the second resolution with the second input image's features at the second resolution.

Each initial depth estimation includes a slanted plane hypothesis for each region (e.g., tile) of a respective initial depth map. The slanted plane hypothesis includes a disparity value, $d_x$ and $d_y$ locations of the slanted plane, and a feature descriptor that represents information about the slanted plane not captured by the disparity value, and the $d_x$ and $d_y$ locations of the slanted plane. In the initialization step, the cost volume that is constructed (e.g., based on the matching) includes the cost for the selected slanted plane hypothesis (but not the evaluated but unselected slanted plane hypotheses) for each region (e.g., per-region cost), and the initialization engine may use the per-region costs to compute the feature descriptor using a neural network. The feature descriptors may be propagated through the later stages to increase the accuracy of the hypothesis refinement at the propagation stage. The initialization engine may include a matching engine that evaluates multiple hypotheses and selects the one with the lowest distance between the left and right view feature. In some examples, the cost volume that is constructed is a full disparity resolution, across all the regions (tiles).

The depth sensing computing system includes a propagation engine that iteratively refines the initial depth estimations based on image warping and spatial propagation. For example, in a first iteration, the propagation engine refines the first initial depth estimation using the extracted features at the first resolution from the feature extractor. In a second iteration, the propagation refines the second initial depth estimation using the refined first depth estimation from the previous iteration and the extracted features at the second resolution, where the refined second depth estimation is used in a subsequent iteration or as a basis for a final depth estimation. In some examples, the refined first depth estimation is upsampled to the second resolution, and the upsampled (refined) first depth estimation is used in the second iteration to refine the second initial depth estimation.

In each iteration, the propagation engine may apply a warping operation using a respective initial depth estimation and the extracted features at a respective resolution and may apply differential two-dimensional (2D) geometric (spatial) propagation on the warped features to infer disparity hypotheses in a manner that does not use the cost volume constructed by the initialization engine but the local cost volumes constructed by the propagation engine. As indicated above, the hypotheses included in the initial depth estimations (which are refined by the propagation engine) provide a local surface representation (e.g., slanted plane plus feature descriptor), which may allow to more accurately perform geometric warping and upsampling operations across multiple resolutions to achieve relatively good sub-pixel precision (e.g., the propagation engine employs an efficient, 2D, disparity propagation stage that makes use of slanted support windows with learned descriptors). The architecture of the real-time active stereo system may generate accurate high resolution depth maps in a manner that is relatively fast while reducing the amount of computational resources to produce such depth maps.

FIGS. 1 through 10 illustrate various aspects of a real-time active stereo system 100 according to an aspect. The real-time active stereo system 100 includes a capture system 102 and a depth sensing computing system 104. The depth sensing computing system 104 includes a feature extractor 116 that extracts features 118 at multiple resolutions (e.g., multi-scale features 118-1, multi-scale features 118-2) from stereo data 110 (e.g., an input image 110-1, an input image 110-2), and an initialization engine 120 configured to compute high resolution matches using a matching engine 122 to predict initial depth estimations 124 at a plurality of resolutions. The initial depth estimations 124 may include an initial depth estimation 124-1 that is predicted based on a matching of features 118R-1 and features 118L-1, and an initial depth estimation 124-2 that is predicted based on a matching of features 118R-2 and features 118L-2, and so forth. The depth sensing computing system 104 includes a propagation engine 126 configured to iteratively refine the initial depth estimations 124 based on image warping and spatial propagation to obtain a final depth estimation 127 that is used within the depth map 129 outputted by the depth sensing computing system 104.

The real-time active stereo system 100 is configured to generate a depth map 129 based on captured stereo data 110 in real-time (or near real-time). A depth map 129 includes, for each region (tile) of a stereo image, a disparity value. The disparity value is inversely related to the distance from a camera viewpoint to the surface of an object in the scene. For example, the depth map 129 may be used to describe an image that contains information relating to the distance from a camera viewpoint to the surface of an object in the scene.

The depth maps 129 may be used to control augmented reality, robotics, natural user interface technology, gaming, or other applications. The real-time active stereo system 100 may construct high-resolution, accurate, 3D models in real-time at a relatively high frame rate. In some examples, the real-time active stereo system 100 is a depth sensing system that can process moving scenes and efficiently generate dense, high quality (accurate) depth maps 129. In some examples, the real-time active stereo system 100 generates a depth map 129 in the millisecond range in a manner that requires fewer computing resources than some conventional approaches. In some examples, the real-time active stereo system 100 generates a highly accurate depth map 129 in less than 200 milliseconds. In some examples, the real-time active stereo system 100 generates a highly accurate depth map 129 in less than 100 milliseconds.

The real-time active stereo system 100 includes a capture system 102 configured to capture stereo data 110 (e.g., a pair of input images such as an input image 110-1 and an input image 110-2), and a depth sensing computing system 104 configured to obtain a depth map 129 based on the stereo image data 110. The depth sensing computing system 104 includes at least one processor 101 and a non-transitory computer-readable medium 103 that stores executable instructions, that when executed by at least one processor 101, is configured to execute the individual components and corresponding functions of the depth sensing computing system 104.

The capture system 102 includes a reference stereo camera 106 and a secondary stereo camera 108. In some examples, the reference stereo camera 106 is considered a left camera. In some examples, the secondary stereo camera 108 is considered a right camera. The reference stereo camera 106 is configured to capture an input image 110-1 (e.g., a left image). The secondary stereo camera 108 is configured to capture an input image 110-2 (e.g., a right image). In some examples, the capture system 102 may include one or more other components such as one or more structured light projectors, a microcontroller, and/or a light source configured to project non-structured light.

The depth sensing computing system 104 receives the input image pair, e.g., the input image 110-1 and the input image 110-2. In some examples, the depth sensing computing system 104 rectifies the input image 110-2 with the input image 110-1 such that their scan lines (e.g., in the x-axis direction) are aligned. For example, the scan lines of the input image 110-1 may be aligned with the scan lines of the input image 110-2 in the x-axis direction.

The depth sensing computing system 104 includes a feature extractor 116 configured to independently extract features 118 from the input image 110-1 and features 118 from the input image 110-2 at multiple resolutions (e.g., from a coarse resolution to a fine resolution). For example, the feature extractor 116 independently extracts multi-scale features 118-1 corresponding to the input image 110-1 and extracts multi-scale features 118-2 corresponding to the input image 110-2.

The multi-scale features 118-1 may include features 118 from the right image (e.g., the input image 110-2) at multiple resolutions. For example, the multi-scale features 118-2 may include features 118R-1 at a first resolution (e.g., a higher or original resolution of the input image 110-2), features 118R-2 at a second resolution (e.g., the second resolution being lower than the first resolution), features 118R-3 at a third resolution (e.g., the third resolution being lower than the second resolution), features 118R-4 at a fourth resolution (e.g., the fourth resolution being lower than the third resolution), and/or features 118R-5 at a fifth resolution (e.g., the fifth resolution being lower than the fourth resolution). In some examples, each of the features 118R-1 through 118R-5 may be referred to as a feature map, where the collection of the features 118R-1 through 118R-5 may be referred to as a set of feature maps (e.g., a set of multi-scale feature maps).

The multi-scale features 118-1 may include features 118 from the left image (e.g., input image 110-1) at multiple resolutions. The multi-scale features 118-1 may include features 118L-1 at the first resolution (e.g., the same resolution as the features 118R-1), features 118L-2 at the second resolution (e.g., the same resolution as the features 118R-2), features 118L-3 at the third resolution (e.g., the same resolution as the features 118R-3), features 118L-4 at the fourth resolution (e.g., the same resolution as the features 118R-4), and features 118L-5 at the fifth resolution (e.g., the same resolution as the features 118R-5). In some examples, each of the features 118L-1 through 118L-5 may be referred to as a feature map, where the collection of the features 118L-1 through 118L-5 may be referred to as a set of feature maps (e.g., a set of multi-scale feature maps). Although the above example uses five different resolutions (e.g., N=5), the embodiments may include any number of resolutions such as two (e.g., N=2), three (e.g., N=3), four (e.g., N=4), or any integer greater than five (e.g., N>5).

The feature extractor 116 includes a neural network (e.g., a convolutional neural network (CNN)) defining a plurality of convolutional blocks. In some examples, a convolutional block may be defined by kernel size, stride, and/or the number of output filters. In some examples, the feature extractor 116 includes a U-net architecture, e.g., an encoder-decoder with skip connections with learnable parameters. In some examples, the feature extractor 116 includes strided convolutions and transposed convolutions with rectified linear activation functions (ReLUs) (e.g., leaky ReLUs). In some examples, the convolutional blocks of the feature extractor 116 define a series of downsamplers and upsamplers.

A convolutional block may represent a layer that can be used to detect features 118 in the input image (e.g., the input image 110-1, the input image 110-2), either working directly on the input image or on the output of a previous convolutional block. Each layer may include a configurable number of filters, where each filter is a matrix (e.g., height, weight, depth) of trainable weights. A convolutional operation is performed between the input image and each filter, producing as output a new image with height and weight determined by the input image, stride and padding (e.g., the output height and weight are inversely proportional to the stride as many color channels as the number of filters). Every value in the tensor is then fed through an activation function to introduce a nonlinearity. Each pixel in the input image represents how strongly the corresponding feature is present in the (height×weight) area centered on that pixel.

In some examples, the features 118 are portions (e.g., patches) of an input image that correspond to points of interest. In some examples, the features 118 includes appearance encoding. For example, appearance encoding is commonly referred to as features 118 in machine learning. In some examples, the features 118 may be referred to as feature maps or a feature matrix with dimensions of height, width, and depth, where depth corresponds to color channels (RGB). The values for the height and the width may define a resolution of the features 118.

Figure 2:
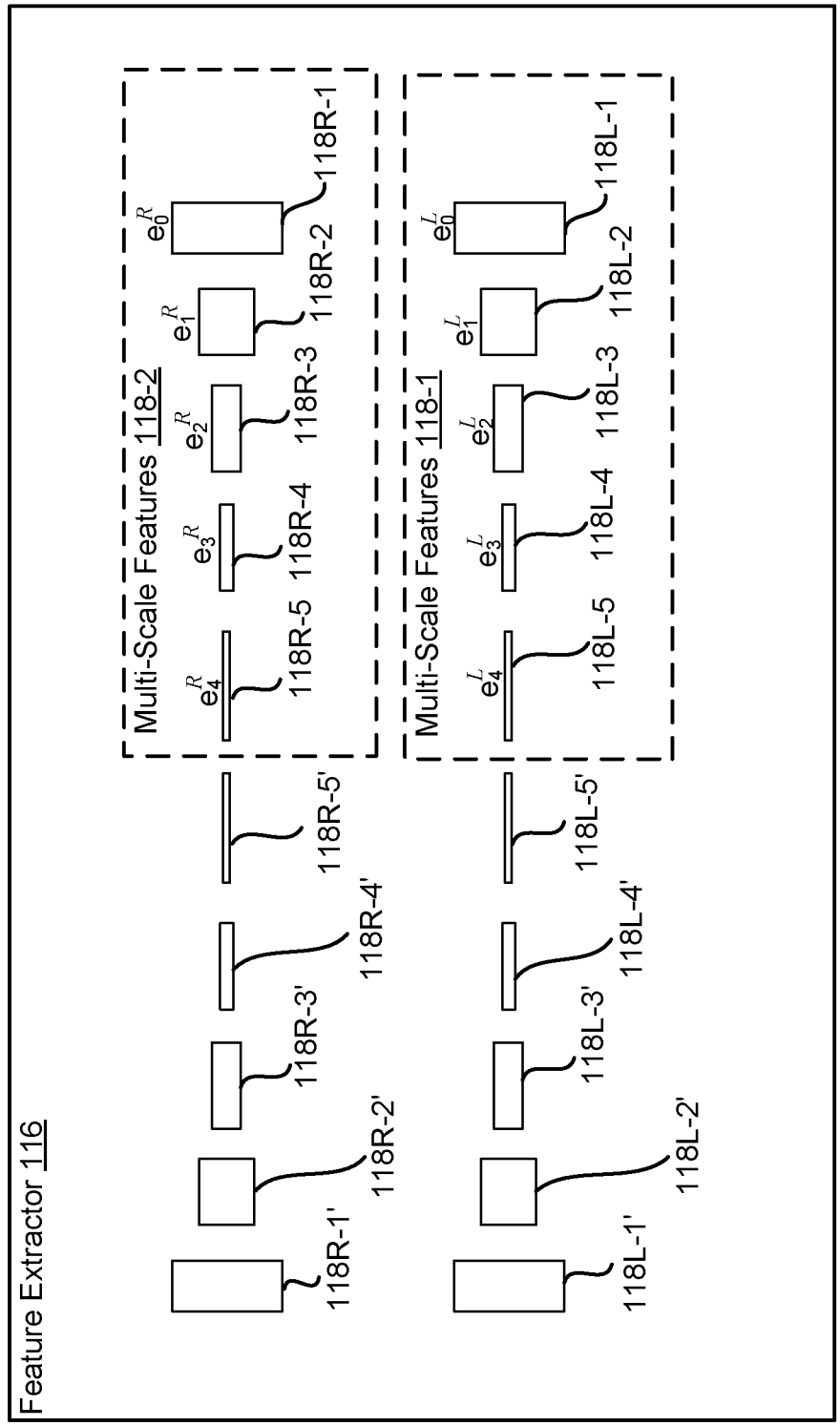
FIG. 2 illustrates an example of a feature extractor of the real-time active stereo system according to an aspect.
Figure 3:
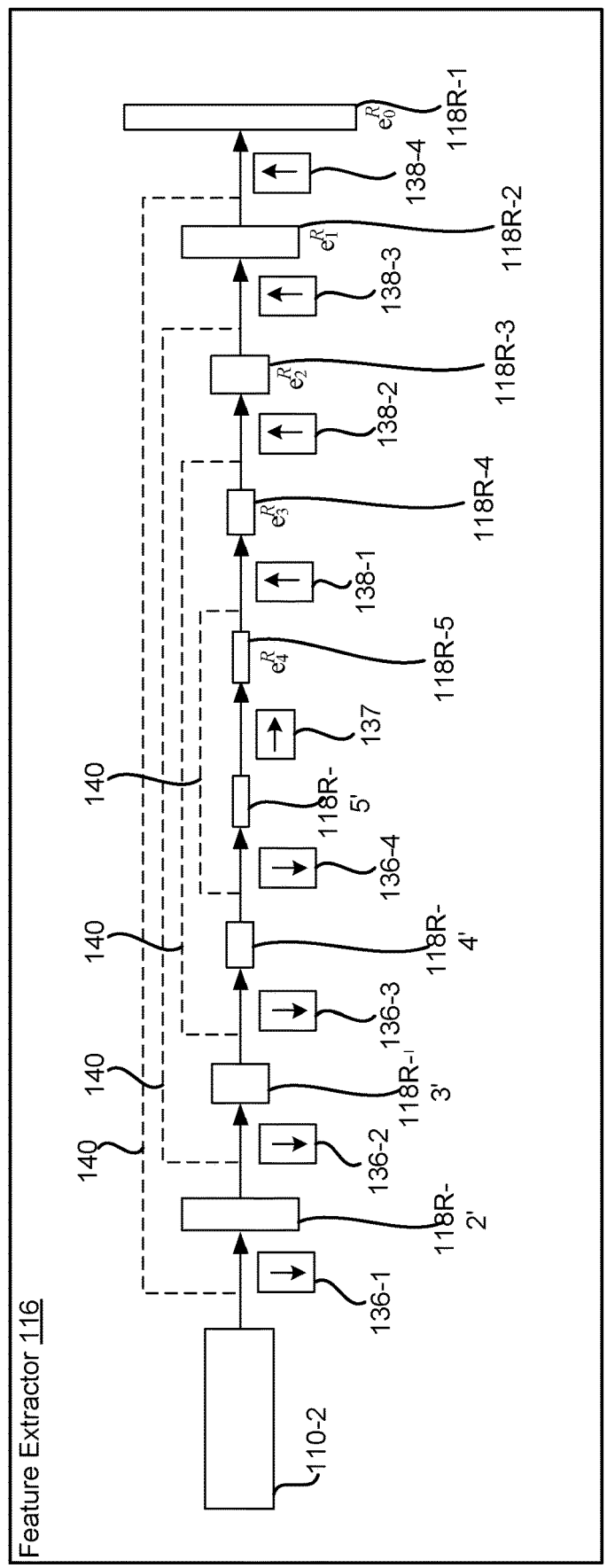
FIG. 3 illustrates an example of the feature extractor according to another aspect.

As shown in FIG. 2, the feature extractor 116 obtains multi-scale features 118-1 associated with the input image 110-1 (e.g., the left image) and the multi-scale features 118-2 associated with the input image 118-2 (e.g., the right image). In some examples, as shown in FIG. 3, the feature extractor 116 is implemented as a U-net architecture, e.g., an encoder-decoder with skip connections 140. Although the architecture of the feature extractor 116 of FIG. 3 is depicted with reference to the input image 110-2, the same architecture is used to create the multi-scale representations 118-1 associated with the input image 110-1. As shown in FIG. 3, the feature extractor 116 includes a plurality of downsampling blocks such as downsampling block 136-1, downsampling block 136-2, downsampling block 136-3, and downsampling block 136-4. The feature extractor 116 includes a plurality of upsampling blocks such as upsampling block 138-1, upsampling block 138-2, upsampling block 138-3, and upsampling block 138-4.

In some examples, each downsampling block (e.g., 136-1, 136-2, 136-3, and 136-4) includes a single 3×3 convolution followed by a 2×2 convolution with stride 2. In some examples, each upsampling block (e.g., 138-1, 138-2, 138-3, and 138-4) includes convolutions (e.g., 2×2 stride 2 transpose convolutions) to upsample results of a coarser U-Net resolution. The features 118 are concatenated with a corresponding skip connection 140, and a convolutional block (e.g., a 1×1 convolution followed by a 3×3 convolution) (not shown in FIG. 3) is applied to merge the skipped and upsampled feature for the current resolution. Each upsampling block generates a feature map (e.g., 118R-5, 118R-4, 118R-3, 118R-2, 118R-1 for the right image, and 118L-5, 118L-4, 118L-3, 118L-2, 118L-1 for the left image), which is then used for downstream tasks and also further upsampled in the feature extractor 116 to generate a higher resolution feature map. The feature extractor 116 is executed on the left image (e.g., the input image 110-1) and the right image (e.g., the input image 110-2) to obtain two multi-scale representations $\varepsilon^L$ and $\varepsilon^R$ (e.g., the multi-scale features 118-1, and the multi-scale features 118-2).

Referring to FIGS. 2 and 3, for each of the input image 110-1 and the input image 110-2, the feature extractor 116 independently extracts features 118 at the original resolution, sequentially downsamples the extracted features 118 until reaching the coarsest resolution (e.g., N=5), and then sequentially upsamples the extracted features 118 until reaching the finest (or original) resolution (e.g., N=1).

With respect to the input image 110-2, the feature extractor 116 may obtain features 118R-1' at the original resolution, downsample the features 118R-1' to obtain features 118R-2' using the downsampling block 136-1, downsample the features 118R-2' to obtain features 118R-3' using the downsampling block 136-2, downsample the features 118R-3' to obtain features 118R-4' using the downsampling block 136-3, and downsample the features 118R-4' to obtain features 118R-5' using the downsampling block 136-4. Then, the feature extractor 116 may obtain features 118R-5 (e.g., $e_4^R$) using convolutional block 137, upsample the features 118R-5 to obtain features 118R-4 (e.g., $e_3^R$) using the upsampling block 138-1, upsample the features 118R-4 to obtain features 118R-3 (e.g., $e_2^R$) using the upsampling block 138-2, upsample the features 118R-3 to obtain features 118R-2 (e.g., $e_2^R$) using the upsampling block 138-3, and upsample the features 118R-2 to obtain features 118R-1 (e.g., $e_0^R$) using the upsampling block 138-4. In some examples, the convolutional block 137 includes multiple convolutions (e.g., 2-3 convolutions) with ReLU (e.g., a rectified linear activation function). In some examples, the upsampled features 118 are included as part of the multi-scale features 118-1, which are then provided to the initialization engine 120 and the propagation engine 126. For example, referring to FIGS. 1 and 2, the multi-scale features 118-1 include the features 118R-5 (e.g., $e_4^R$), the features 118R-4 (e.g., $e_3^R$), the features 118R-3 (e.g., $e_3^R$), the features 118R-2 (e.g., $e_1^R$), and the features 118R-1 (e.g., $e_0^R$).

With respect to the input image 110-1, the feature extractor 116 may obtain features 118L-1' at the original, downsample the features 118L-1' to obtain features 118L-2' using the downsampling block 136-1, downsample the features 118L-2' to obtain features 118L-3' using the downsampling block 136-2, downsample the features 118L-3' to obtain features 118L-4' using the downsampling block 136-3, and downsample the features 118L-4' to obtain features 118L-5' using the downsampling block 136-4. Then, the feature extractor 116 may obtain features 118L-5 (e.g., $e_4^R$), upsample the features 118L-5 to obtain features 118L-4 (e.g., $e_3^L$) using the upsampling block 138-1, upsample the features 118L-4 to obtain features 118L-3 (e.g., $e_2^L$) using the upsampling block 138-2, upsample the features 118L-3 to obtain features 118L-2 (e.g., $e_1^L$) using the upsampling block 138-3, and upsample the features 118L-2 to obtain features 118L-1 (e.g., $e_0^L$) using the upsampling block 138-4. In some examples, the upsampled features 118 are included as part of the multi-scale features 118-2, which are then provided to the initialization engine 120 and the propagation engine 126. For example, referring to FIGS. 1 and 2, the multi-scale features 118-2 include the features 118L-5 (e.g., $e_4^L$), the features 118L-4 (e.g., $e_3^L$), the features 118L-3 (e.g., $e_2^L$), the features 118L-2 (e.g., $e_1^L$), and the features 118L-1 (e.g., $e_0^L$).

Figure 4:
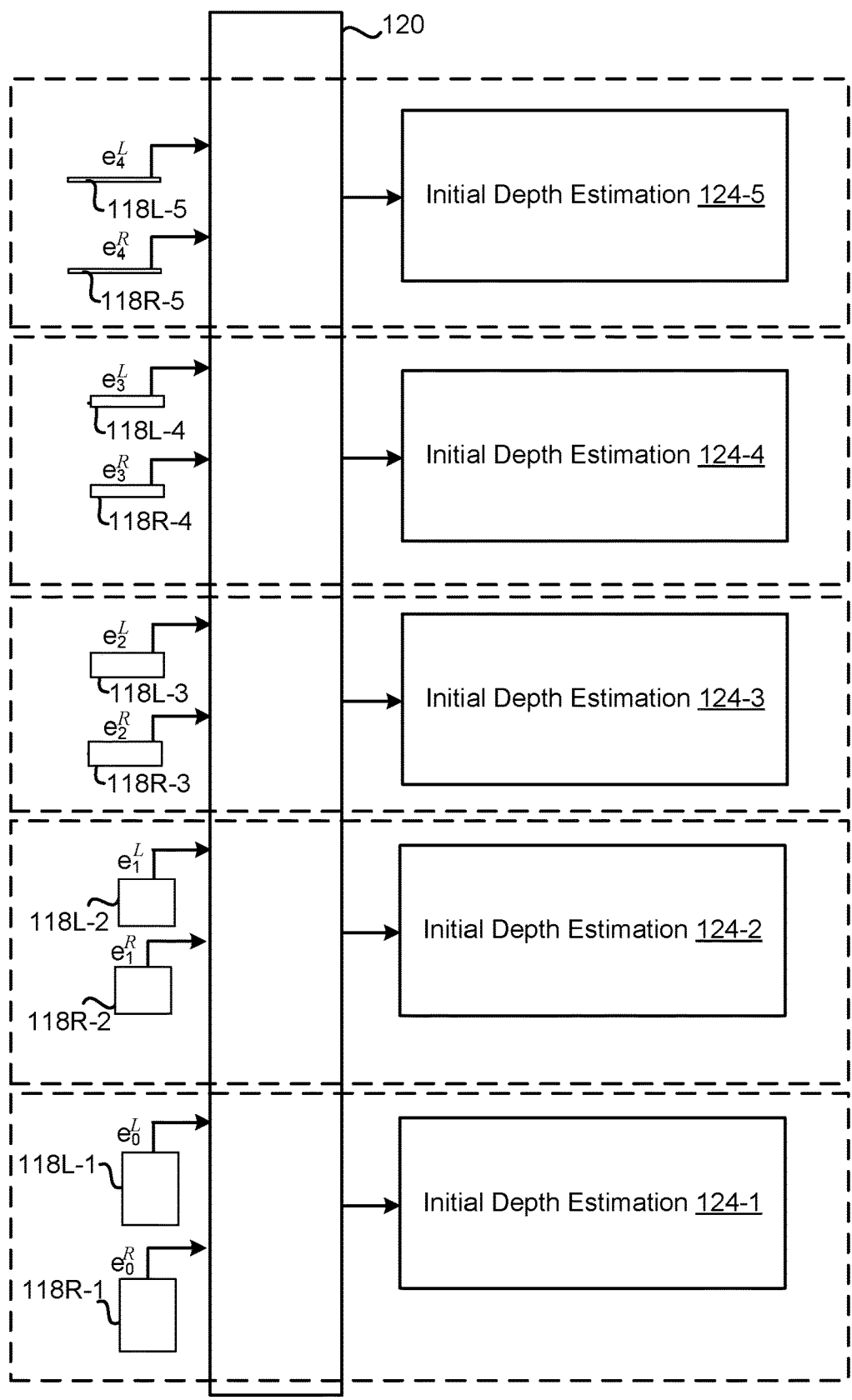
FIG. 4 illustrates an example of an initialization engine that predicts a plurality of initial depth estimations according to an aspect.

Referring back to FIG. 1, the initialization engine 120 receives the multi-scale features 118-1 and the multi-scale features 118-2 from the feature extractor 116. The initialization engine 120 may predict initial depth estimations 124 at a plurality of resolutions based on the multi-scale features 118-1 and the multi-scale features 118-2. Referring to FIG. 4, the initialization engine 120 may predict an initial depth estimation 124-1 according to the first resolution based on a matching of the features 118L-1 with the features 118R-1, an initial depth estimation 124-2 according to the second resolution based on a matching of the features 118L-2 with the features 118R-2, an initial depth estimation 124-3 according to the third resolution based on a matching of the features 118L-3 with the features 118R-3, an initial depth estimation 124-4 according to the fourth resolution based on a matching of the features 118L-4 with the features 118R-4, and an initial depth estimation 124-5 according to the fifth resolution based on a matching of the features 118L-5 with the features 118R-5.

Figure 5:
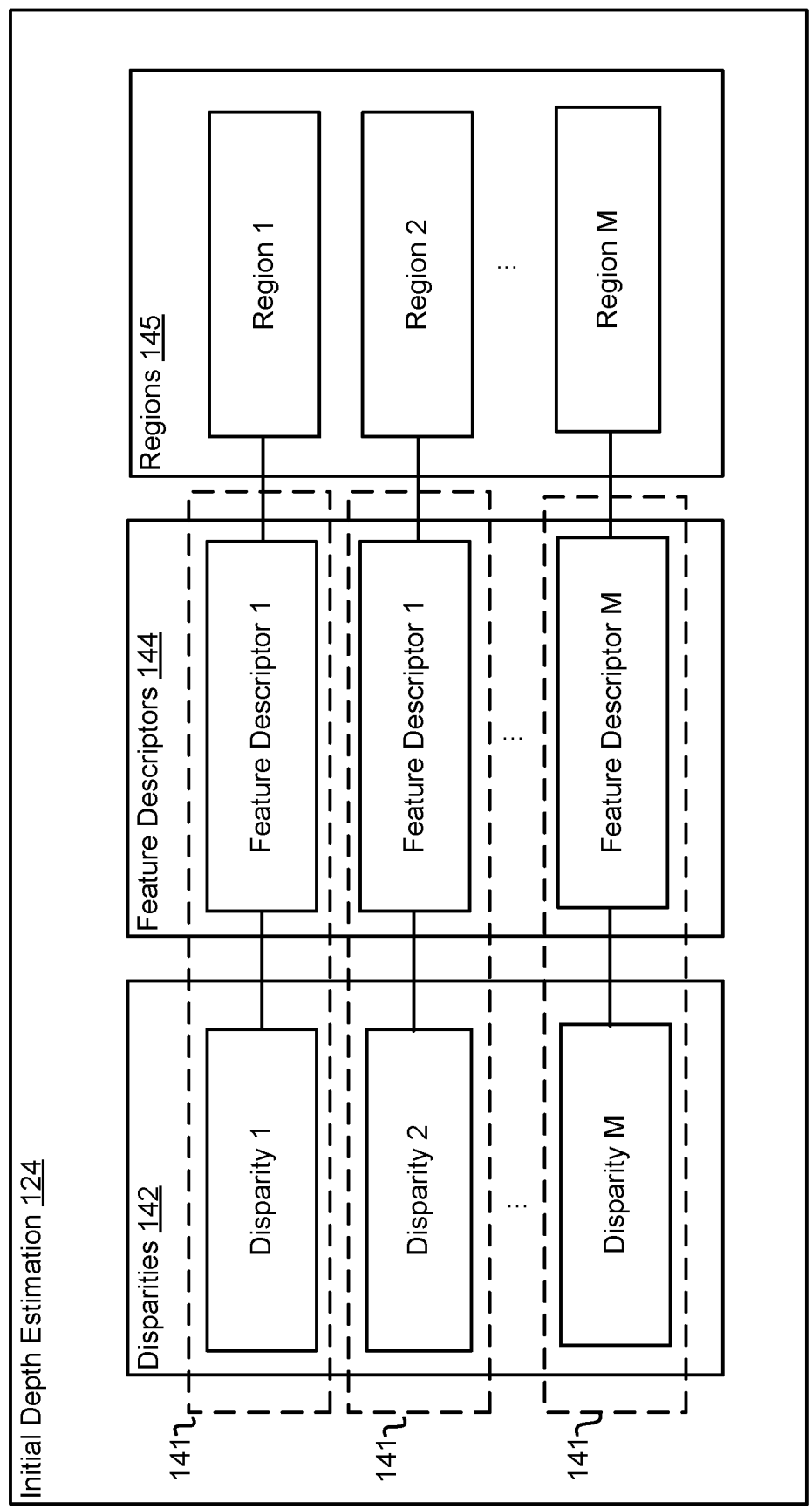
FIG. 5 illustrates an example of an initial depth estimation having a plane hypothesis for each region according to an aspect.

Referring to FIG. 5, each initial depth estimation (e.g., 124-1 through 124-5) may include a plane hypothesis 141 associated with (or corresponding to) each region 145 of a depth map. For example, a depth map 129 may include a plurality of regions 145, where each region is a portion of image data. In some examples, the initialization engine 120 may divide the stereo data 110 into regions 145 of a predetermined size. It is noted that the regions may be referred to as tiles. In some examples, the regions are rectangular times having the same size. In some examples, each region 145 is 4×4 pixels. However, the size of the region 145 may encompass other values. The initialization engine 120 may predict a plane hypothesis 141 for each region 145 (e.g., one plane hypothesis 141 per region 145) according to multiple resolutions. In some examples, a plane hypothesis 141 includes a slanted three-dimensional (3D) plane. In some examples, a plane hypothesis 141 may be referred to as a vector which encodes a slanted 3D plane. In some examples, the plane hypothesis 141 is referred to as a tile hypothesis. In some examples, the plane hypotheses 141 are stored in a 2D array, so the coordinates in that array may be the region information (e.g., that identifies a particular region 125).

In some examples, a plane hypothesis 141 includes a disparity 142 and a feature descriptor 144. In some examples, a plane hypothesis 141 includes a geometric part describing a slanted plane with an initial disparity 142 and the gradient of disparity in x and y directions ($d_x$, $d_y$) and a learnable part that includes a feature descriptor 144. The feature descriptor 144 may be a learned representation of the region 145 which allows the depth sensing computing system 104 to attach additional information to the region 145. In some examples, the feature descriptor 144 may include information about matching quality. In some examples, the feature descriptor 144 may include information about one or more local surface properties such as a level of how much the geometry is planar. However, the feature descriptor 144 may encompass a wide variety of data. As shown in FIG. 5, an initial depth estimation 124 may include a plane hypothesis 141 that includes an initial disparity 1 and a feature descriptor 1 for a region 1, and a plane hypothesis 141 that includes an initial disparity 2 and a feature descriptor 2 for a region 2 through a plane hypothesis 141 having an initial disparity M and feature descriptor M for a region M, where M is the total number of regions 145.

Figure 6:
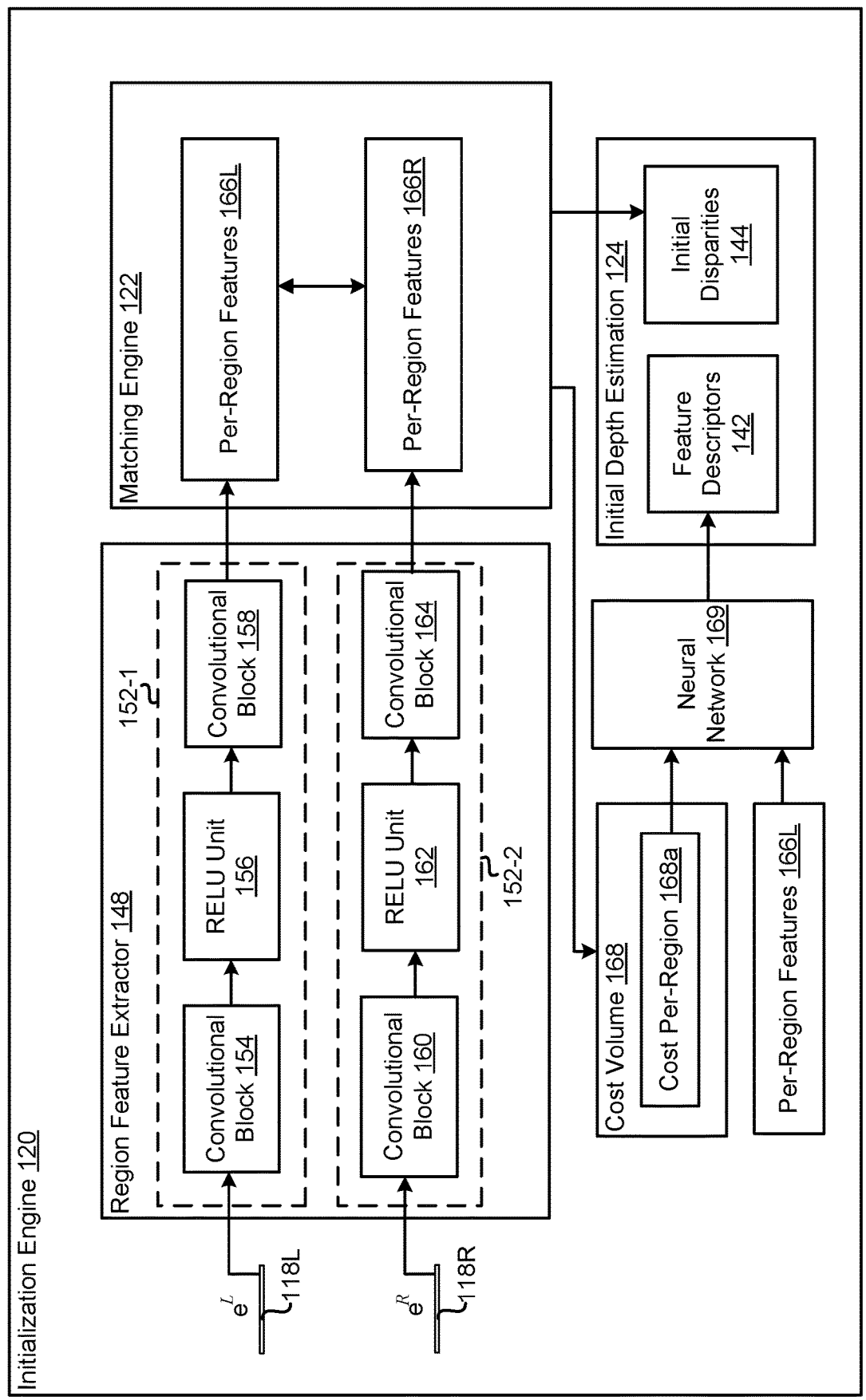
FIG. 6 illustrates an example of the initialization engine according to an aspect.

Referring to FIG. 6, the initialization engine 120 may include a region feature extractor 148 that extracts per-region features 166L and per-region features 166R, a matching engine 122 that computes a cost volume 168 based on a matching of the per-region features 166L and the per-region features 166R and predicts initial disparities 142 based on the cost volume 168, and a neural network 169 that predicts the feature descriptors 144.

Initially, it is noted that in order to keep the initial disparity resolution high, overlapping regions 145 are used along the x direction (e.g., the width) in the right image (e.g., the input image 110-2). However, non-overlapping regions 145 are used in the left image for efficient matching. As further explained below, to extract the region features, (e.g., per-region features 166L, per-region features 166R) a convolution (e.g., a 4×4 convolution applied by convolutional block 154) on each extracted feature map (e.g., 118L-1 through 118L-5) associated with the left image. The strides for the left image and the right image are different to facilitate the aforementioned overlapping tiles. In some examples, for the left image, strides of 4×4 are used, and, for the right image, strides of 4×1 are used, which may enable the initialization engine 120 to maintain the full disparity resolution to maximize accuracy.

In further detail, the region feature extractor 148 may include a convolutional module 152-1 that extracts the per-region features 166L using features 118L. The features 118L may be the features 118L-1 when the initial depth estimation 124-1 is predicted, or the features 118L may be the features 118L-2 when the initial depth estimation 124-2 is predicted and so forth. The region feature extractor 148 receives the features 118L (which are not on a region-by-region basis) and extracts per-region features 166L (e.g., arranges the features on a per-region basis). The convolutional module 152-1 may include one or more convolutional blocks. In some examples, the convolutional module 152-1 includes a convolutional block 154, a RELU unit 156 (e.g., a leaky ReLU), and a convolutional block 158. In some examples, the convolutional block 154 applies a 4×4 convolution to the features 118L. In some examples, the convolutional block 158 applies a 1×1 convolution.

The region feature extractor 148 may include a convolutional module 152-2 that extracts the per-region features 166R using features 118R. The features 118R may be the features 118R-1 when the initial depth estimation 124-1 is predicted, or the features 118R may be the features 118R-2 when the initial depth estimation 124-2 is predicted, and so forth. The region feature extractor 148 receives the features 118R (which are not on a region-by-region basis) and extracts per-region features 166R (e.g., arranges the features on a per-region basis). The convolutional module 152-2 may include one or more convolutional blocks. In some examples, the convolutional module 152-2 includes a convolutional block 160, a RELU unit 162, and a convolutional block 164. In some examples, the convolutional block 160 is different from the convolutional block 154. In some examples, the convolutional block 160 applies a 4×1 convolution. In some examples, the convolutional block 164 applies a 1×1 convolution. As indicated above, the strides (e.g., 4×4) of convolutional block 154 is different than the strides (e.g., 4×1) of convolutional block 160, which may enable the initialization engine 120 to maintain the full disparity resolution to maximize accuracy.

The matching engine 122 may receive the per-region features 166L and the per-region features 166R. As indicated above, the width of the per-region regions 166L may be different than the width of the per-region features 166R (e.g., due to the strides (e.g., 4×4) of convolutional block 154 being different than the strides (e.g., 4×1) of convolutional block 160). The matching engine 122 may match the per-region features 166L with the per-region features 166R along the scan lines (e.g., x-axis). The matching engine 122 may compute a cost volume 168 based on a matching of the per-region features 166R and the per-region features 166L. The cost volume 168 includes the cost for the selected plane hypothesis for each region 145 (e.g., per-region cost). In some examples, the cost volume 168 is computed based on the sum of absolute differences (SAD). However, the embodiments encompass any other type of cost function that measures a level of difference between intensity of corresponding pixels such as sum of squared difference (SSD), Hamming distances, or other techniques. In some examples, the cost volume 168 is considered a full disparity resolution.

At each region 145, the matching engine 122 may evaluate a number of plane hypothesis 141 (each defining an initial disparity 142) and select the one with the lowest cost (e.g., select an initial disparity 142 having the best match (lowest cost)). For instance, for a particular region 145, the matching engine 122 may evaluate a first slanted plane hypothesis by computing a first cost and a second slanted plane hypothesis by computing a second cost. If the second cost is lower than the first cost, the matching engine 122 may select the second slanted plane hypothesis for that region 145 and record the cost of the second slanted plane hypothesis in the cost volume 168. The matching engine 122 may record (in the cost volume 168) the cost (also referred to as matching cost or cost of disagreement) associated with the selected plane hypothesis 141 for a particular region 145 (e.g., not the costs associated with evaluated but unselected plane hypothesis). As such, in some examples, the cost volume 168 may be considered a less than full cost volume. In other words, the cost volume 168 includes a cost per-region 168a for all the regions of the depth map (e.g., a single cost per region that corresponds to the cost of the selected plane hypothesis).

The initialization engine 120 includes a neural network 169 configured to predict a feature descriptor 144 for each region 145. For example, the neural network 169 receives the cost per-region 168a and the per-region features 166L as inputs and predicts the feature descriptor 144 for each region 145. In some examples, the features (e.g., per-region features 166L) from the left image are used for the feature descriptor prediction. In some examples, the features (e.g., per-region features 166L) from the right image are used for the feature descriptor prediction. In some examples, the neural network 169 includes a perceptron $\mathcal{D}$, with learnable weights $\mathcal{D}$, which is implemented with a 1×1 convolution followed by a leaky ReLU.

Referring back to FIG. 1, the propagation engine 126 is configured to iteratively refine the initial depth estimations 124 based on image warping and spatial propagation to obtain a final depth estimation 127 that is used within the depth map 129 outputted by the depth sensing computing system 104. For example, the propagation engine 126 may receive the multi-scale features 118-1 and the multi-scale features 118-2 and iteratively refine (update) the initial depth estimations 124 using the multi-scale features 118-1 and the multi-scale features 118-2. The propagation engine 126 may include a plurality of update prediction engines 128. In some examples, a separate update prediction engine 128 is provided in each iteration.

In a first iteration, an update prediction engine 128-1 receives initial depth estimation 124-5 (e.g., corresponding to the fifth resolution or coarsest resolution) and refines the initial depth estimation 124-5 using the features 118R-5 and the features 118L-5 to predict a refined depth estimation 124-5'. Then, the refined depth estimation 124-5' is upsampled to the fourth resolution using an upsampler 130.

In a second iteration, an update prediction engine 128-2 receives the initial depth estimation 124-4 and the upsampled (refined) depth estimation 124-5'. For example, in the second iteration, a concatenate unit 132 concatenates the initial depth estimation 124-4 and the upsampled (refined) depth estimation 124-5' and provides them both to the update prediction engine 128-2. The update prediction engine 128-2 refines the initial depth estimation 124-4 using the upsampled (refined) depth estimation 124-5' and the features 118R-4 and the features 118L-4.

As indicated above, the initial depth estimation 124-4 includes a plane hypothesis 141 (also referred to as $h_{init}$) for each region 145, and the upsampled (updated) depth estimation 124-5' includes a plane hypothesis 141 (also referred to as hcoarse) for each region 145. The update prediction engine 128-2 is configured to predict an updated plane hypothesis 141 (also referred to as $h'_{init}$) and confidence value 180 (also referred to as $w_{init}$) for each region 145 in the initial depth estimation 124-4 based on the features 118R-4 and the features 118L-4. Also, the update prediction engine 128-2 is configured to predict an updated plane hypothesis 141 (also referred to as $h'_{coarse}$) and confidence value 180 (also referred to as $w_{coarse}$) for each region 145 in the upsampled (updated) depth estimation 124-5' based on the features 118R-4 and the features 118L-4.

For each region 145, the update prediction engine 128-2 is configured to compare $w_{init}$ and $w_{coarse}$. If $w_{init}$ is greater than $w_{coarse}$, the update prediction engine 128-2 is configured to select $h'_{init}$ for the plane hypothesis 141 associated with a respective region 145. If $w_{init}$ is less than or equal to $w_{coarse}$, the update prediction engine 128-2 is configured to select $h'_{coarse}$ for the plane hypothesis 141 associated with a respective region 145. The update prediction engine 128-2 is configured to output a refined depth estimation 124-4'.

Then, the refined depth estimation 124-4' is upsampled to the third resolution using an upsampler 130. The same process continues in a third iteration to update the initial depth estimation 124-3 at the third resolution (not shown in FIG. 1) and the same process continues in a fourth iteration to update the initial depth estimation 124-2 at the fourth resolution (not shown in FIG. 1). Then, in a last iteration, a concatenate unit 132 concatenates the initial depth estimation 124-1 and the upsampled (refined) depth estimation from the previous iteration and provides them both to an update prediction engine 128-3. The update prediction engine 128-3 refines the initial depth estimation 124-1 using the upsampled (refined) depth estimation from the previous iteration and the features 118R-1 and the features 118L-1. The update prediction engine 128-3 performs the same operations described above with reference to the update prediction engine 128-2 to predict a refined depth estimation 124-1' at the first resolution (or finest resolution). In some examples, the propagation engine 126 includes another update prediction engine 128-3 to further refine the refined depth estimation 124-1' to predict a final depth estimation 127, which is used in a depth map 129 outputted by the depth sensing computing system. In some examples, the propagation engine 126 includes one or more update prediction engines 128-3 in which the result of the previous block is upsampled and refined again (but without additional initialization input), and this process may repeat until the full resolution of the disparity predictions is reached.

Figure 7:
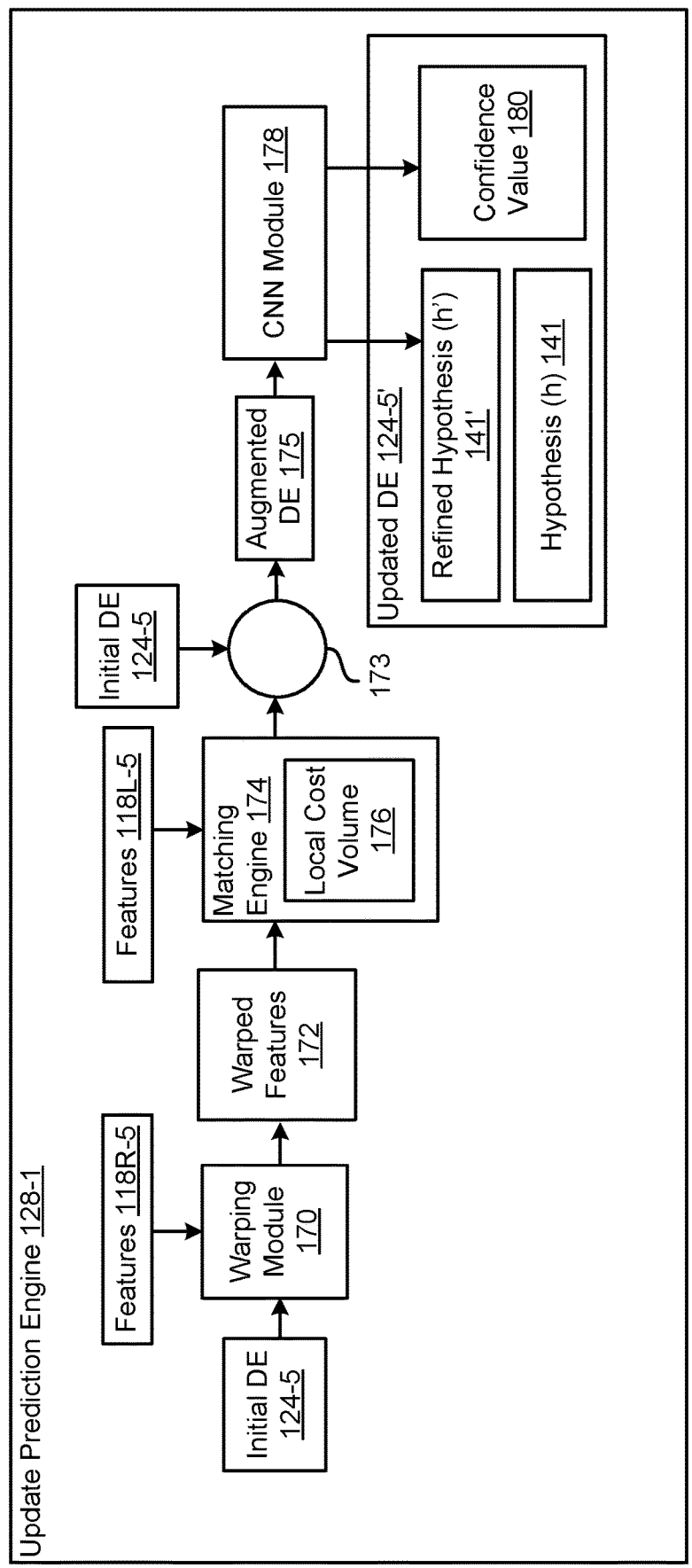
FIG. 7 illustrates an example of an update prediction engine according to an aspect.

FIG. 7 illustrates an example of the update prediction engine 128-1. Referring to FIG. 7, the update prediction engine 128-1 may include a warping module 170 that receive the initial depth estimation 124-5 and the features 118R-5 and uses the initial depth estimation 124-5 to warp the features 118R-5, thereby obtaining warped features 172. The update prediction engine 128-1 includes a matching engine 174 that computes a local cost volume 176 based on a matching of the warped features 172 with the features 118L-5. The update prediction engine 128-1 includes a concatenate unit 173 that concatenates the local cost volume 176 with the initial depth estimation 124-5 to generate an augmented depth estimation 175. The update prediction engine 128-1 includes a CNN module 178 that receives the augmented depth estimation 175 as an input and predicts an updated depth estimation 124-5'. The updated depth estimation 124-5' includes a refined hypothesis (h') 141, the hypothesis (h) 141 (e.g., the initial hypothesis), and a confidence value (w) for each region 145.

Figure 8:
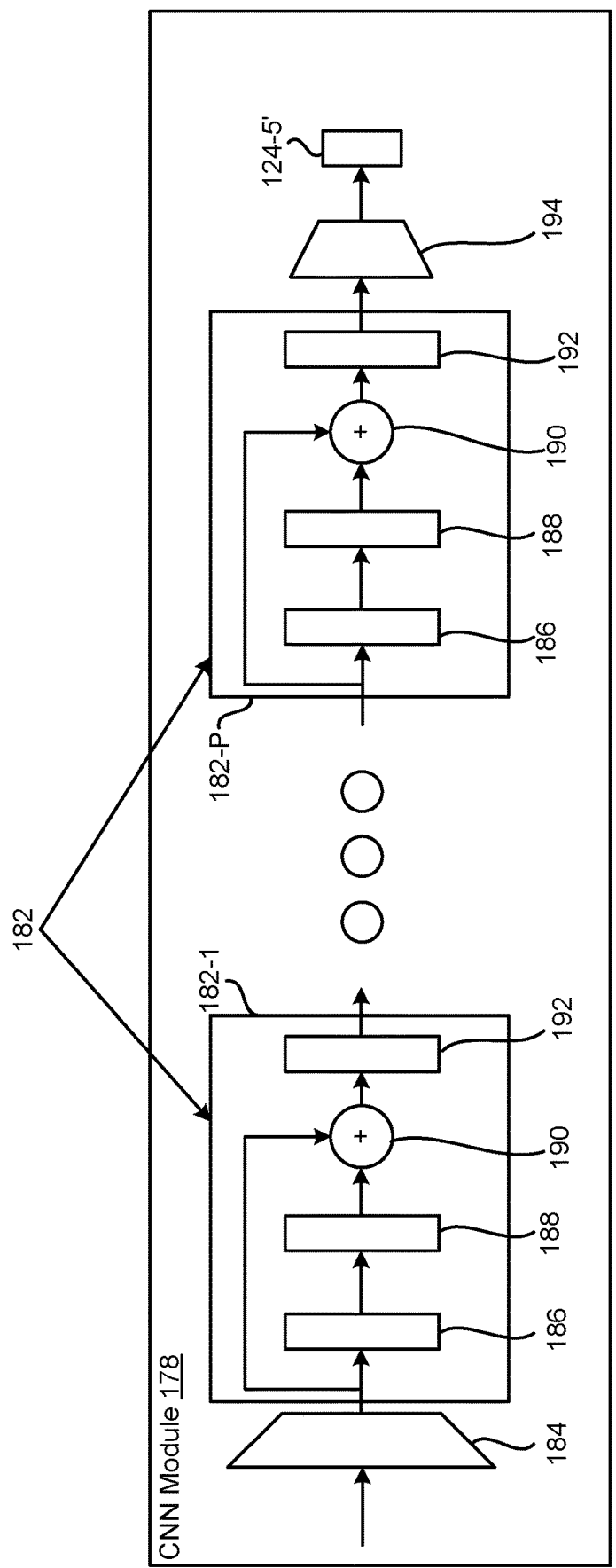
FIG. 8 illustrates an example of a convolutional neural network (CNN) module of the update prediction engine according to an aspect.

FIG. 8 illustrates an example of the CNN module 178 according to an aspect. In some examples, the CNN module 178 includes a plurality of residual blocks 182 such as a residual block 182-1 through residual block 182-P, where P can be any integer greater or equal to two. The CNN module 178 includes a convolutional block 184 coupled to an input of the residual block 182-1. In some examples, the convolutional block 184 is configured to apply a 1×1 convolution followed by a leaky ReLU operation. The convolutional block 184 is configured to reduce the number of feature channels. The convolutional block 184 is configured to receive the augmented depth estimation 175. The CNN module 178 includes a convolutional block 194 coupled to an output of the last residual block (e.g., residual block 182-P). In some examples, the convolutional block 194 is configured to apply a 3×3 convolution. The output of the convolutional block 194 is the refined depth estimation 124-5'.

Figure 9D:
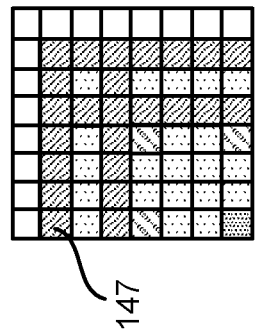
FIGS. 9A through 9D illustrate an expansion of a receptive field via dilation convolutions according to an aspect.
Figure 9C:
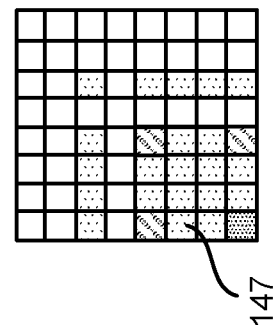
Figure 9B:
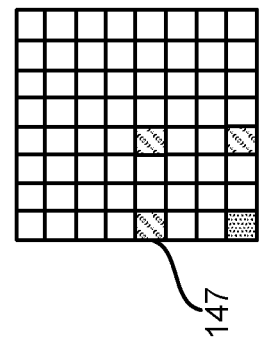
Figure 9A:
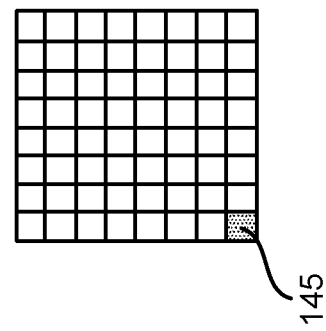

In some examples, the residual blocks 182 do not have batch normalization. In some examples, each residual block 182 is associated with a different dilation factor, where each residual block 182 may include a number of convolutional blocks. For example, the residual blocks 182 apply dilated convolutions to increase the receptive field, which is further shown in FIGS. 9A through 9D. For example, referring to FIG. 9A, a location of a region 145 is depicted. In FIG. 9B, a residual block 182 may apply a dilation convolution which increases the receptive field (e.g., the location of neighboring regions 147) that are used for the refinement. In some examples, FIG. 9B illustrates a dilation of three. In FIG. 9C, another residual block 182 may apply a dilation convolution which increases the receptive field again. In some examples, FIG. 9C illustrates a dilation of two. In FIG. 9D, another residual block 182 may apply a dilation convolution which increases the receptive field again. In some examples, FIG. 9D illustrates a dilation of one.

In some examples, each residual block 182 may include convolutional block 186, a convolutional block 188, an adder unit 190 that adds the input to the convolutional block 186 to the output of the convolutional block 188, and a rectifier unit 192 (e.g., leaky ReLU). In some examples, the convolutional block 186 applies a 3×3 convolution followed by a leaky ReLU. In some examples, the convolutional block 188 applies a 3×3 convolution.

Figure 10:
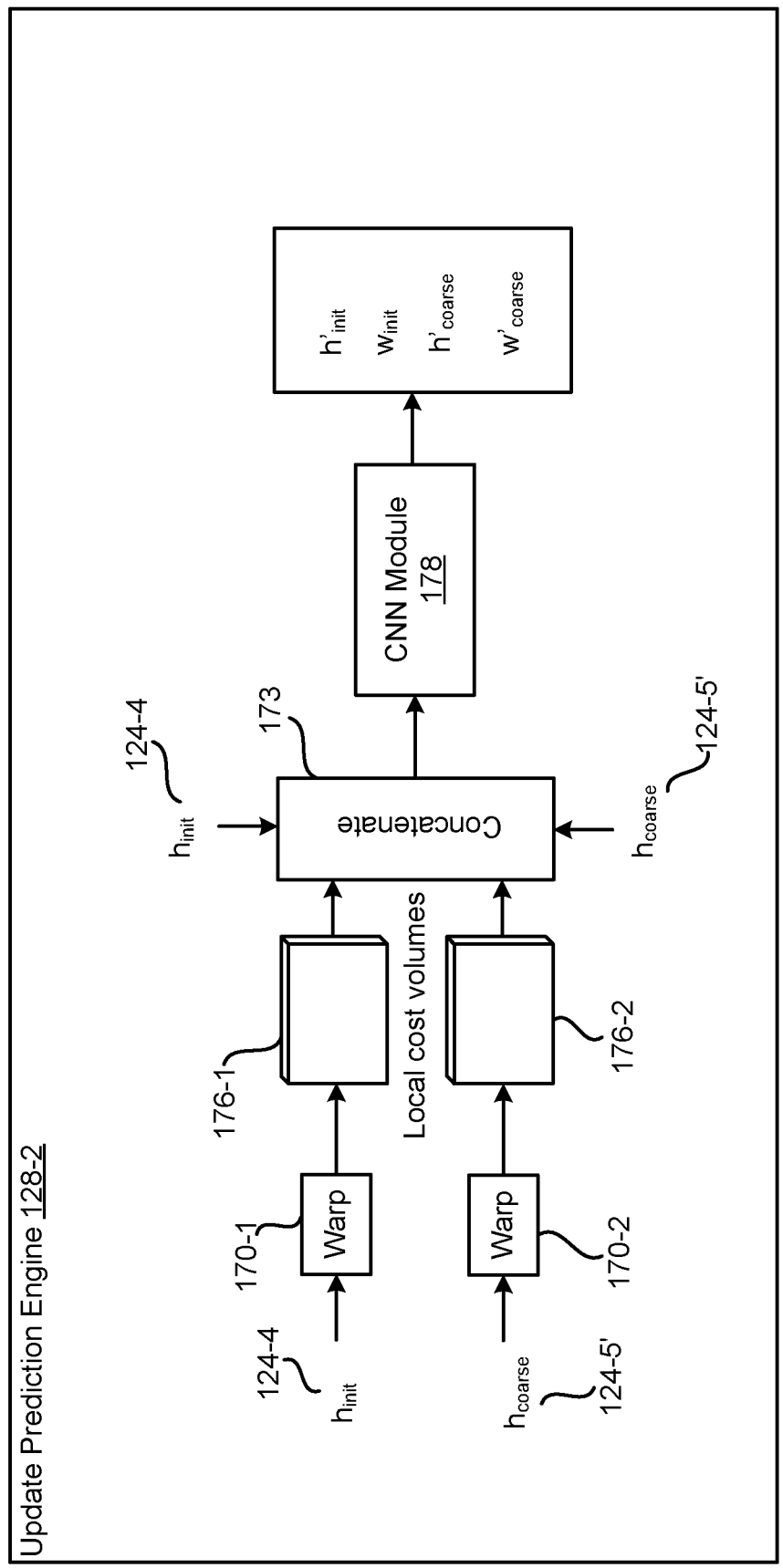
FIG. 10 illustrates an example of an update prediction engine according to an aspect.

FIG. 10 illustrates an example of an update prediction engine 128-2. The update prediction engine 128-2 may be similar to the update prediction engine 128-1 of FIG. 9, and therefore may include any of the details discussed with reference to that figure. However, with respect to the update prediction engine 128-2 (and the other update prediction engines associated with the other iterations), the update prediction engine 128-2 receives two plane hypothesis for each region 145, e.g., $h_{init}$ which relates to the initial depth estimation 124-4 and hcoarse which relates to the refined (upscaled) depth estimation 124-5' received from the previous iteration.

The update prediction engine 128-2 includes a warping module 170-1 that receives the initial depth estimation 124-4 ($h_{init}$) and performs a warping operation in the same manner as described above. For example, the warping module 170-1 may receive the initial depth estimation 124-4 and the features 118R-4 and uses the initial depth estimation 124-4 to warp the features 118R-4, thereby obtaining warped features (e.g., warped features 172). Then, a matching engine (e.g., matching engine 174) computes a local cost volume 176-1 based on a matching of the warped features with the features 118L-4.

The update prediction engine 128-2 includes a warping module 170-2 that receives the refined (upscaled) depth estimation 124-5' received from the previous iteration and performs a warping operation in the same manner as described above. For example, the warping module 170-2 may receive the refined (upscaled) depth estimation 124-5' and the features 118R-4 and use the refined (upscaled) depth estimation 124-5' to warp the features 118R-4, thereby obtaining warped features (e.g., warped features 172). Then, a matching engine (e.g., matching engine 174) computes a local cost volume 176-2 based on a matching of the warped features with the features 118L-4.

The update prediction engine 128-2 includes a concatenate unit 173 concatenates the local cost volume 176-1 with the initial depth estimation 124-4 to generate a first augmented depth estimation. Also, the concatenate unit 173 concatenates the local cost volume 176-2 with the refined (upscaled) depth estimation 124-5' to generate a second augmented depth estimation. The update prediction engine 128-2 includes a CNN module 178 that receives the first and second augmented depth estimations and computes $h'_{init}$, $w_{init}$, $h'_{coarse}$, and $w'_{coarse}$.

As indicated above, the initial depth estimation 124-4 includes a plane hypothesis 141 (also referred to as $h_{init}$) for each region 145, and the upsampled (refined) depth estimation 124-5' includes a plane hypothesis 141 (also referred to as hcoarse) for each region 145. The CNN module 178 is configured to predict a refined plane hypothesis 141 (also referred to as $h'_{init}$) and a confidence value 180 (also referred to as $w_{init}$) for each region 145 in the initial depth estimation 124-4 based on the first augmented depth estimation. Also, the CNN module 178 is configured to predict a refined plane hypothesis 141 (also referred to as $h'_{coarse}$) and a confidence value 180 (also referred to as $w_{coarse}$) for each region 145 in the upsampled (refined) depth estimation 124-5' based on the second augmented depth estimation.

For each region 145, the update prediction engine 128-2 is configured to compare $w_{init}$ and $w_{coarse}$. If $w_{init}$ is greater than $w_{coarse}$, the update prediction engine 128-2 is configured to select $h'_{init}$ for the plane hypothesis 141 associated with a respective region 145. If $w_{init}$ is less than or equal to $w_{coarse}$, the update prediction engine 128-2 is configured to select $h'_{coarse}$ for the plane hypothesis 141 associated with a respective region 145. The update prediction engine 128-2 is configured to output a refined depth estimation 124-4'.

Figure 11:
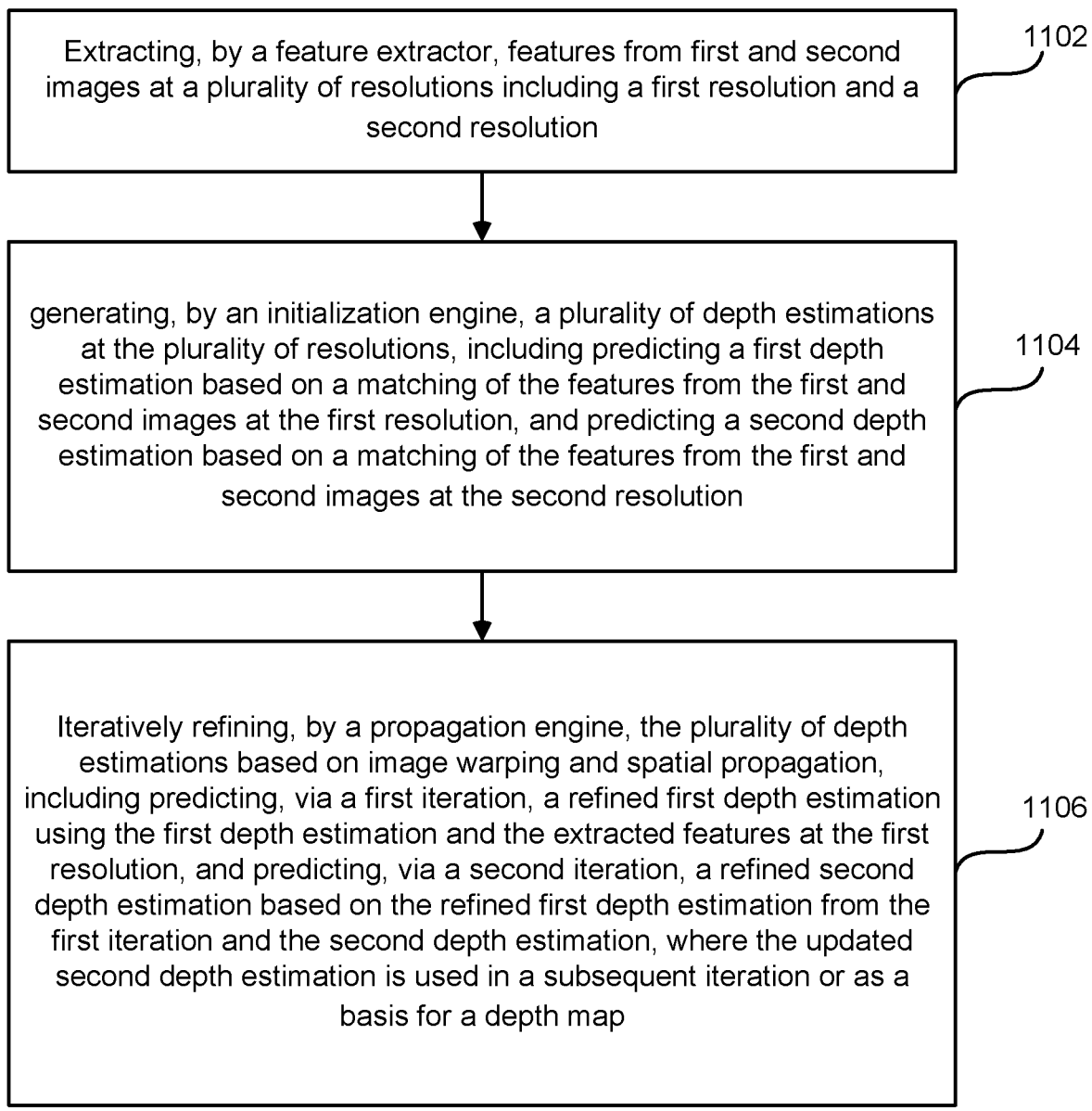
FIG. 11 illustrates a flowchart depicting example operations of the real-time active stereo system according to an aspect.

FIG. 11 illustrates a flowchart 1100 depicts example operations of the real-time active stereo system 100 according to an aspect. Although the flowchart 1100 of FIG. 11 illustrates the operations in sequential order, it will be appreciated that this is merely an example, and that additional or alternative operations may be included. Further, operations of FIG. 11 and related operations may be executed in a different order than that shown, or in a parallel or overlapping fashion.

Operation 1102 includes extracting, by a feature extractor, features from first and second images at a plurality of resolutions including a first resolution and a second resolution.

Operation 1104 includes generating, by an initialization engine, a plurality of depth estimations at the plurality of resolutions, including predicting a first depth estimation based on a matching of the features from the first and second images at the first resolution, and predicting a second depth estimation based on a matching of the features from the first and second images at the second resolution.

Operation 1106 includes iteratively refining, by a propagation engine, the plurality of depth estimations based on image warping and spatial propagation, including predicting, via a first iteration, a refined first depth estimation using the first depth estimation and the extracted features at the first resolution, and predicting, via a second iteration, a refined second depth estimation based on the refined first depth estimation from the first iteration and the second depth estimation, where the refined second depth estimation is used in a subsequent iteration or as a basis for a depth map.

The following description provides formalization and mathematical equations of the above-described depth sensing computing system 104.

As described above, the embodiments include a neural network architecture for real-time stereo matching. Contrary to many recent neural network approaches that operate on a full cost volume and rely on 3D convolutions, in some examples, the real-time active stereo system 100 may not explicitly construct a cost volume. Rather, the real-time active stereo system 100 may incorporate a fast multi-resolution initialization step, and differentiable 2D geometric propagation and warping mechanisms to infer disparity hypotheses. To achieve a high level of accuracy, the real-time active stereo system 100 not only geometrically reasons about disparities but also infers slanted plane hypotheses, thereby allowing to perform geometric warping and upsampling operations more accurately. The architecture is inherently multi-resolution allowing the propagation of information across different levels. Multiple experiments prove the effectiveness of the proposed approach at a fraction of the computation required by some conventional approaches.

In some examples, the real-time active stereo system 100 provides a framework for neural network based depth estimation which overcomes the computational disadvantages of operating on a 3D volume by integrating image warping, spatial propagation, and a fast high resolution initialization step into the network architecture, while keeping the flexibility of a learned representation by allowing features to flow through the network. In some examples, the real-time active stereo system 100 may represent image regions (tiles) as planar patches which have a learned compact feature descriptor attached to them. In some examples, the real-time active stereo system 100 may fuse information from the high resolution initialization and the current hypotheses using spatial propagation. The propagation is implemented via a convolutional neural network module (e.g., 128-1, 128-2, 128-3, etc.) that updates the estimate of the planar patches and their attached features. In order for the network to iteratively increase the accuracy of the disparity predictions, the real-time active stereo system 100 uses a local cost volume in a narrow band (+/−1 disparity) around the planar patch using in-network image warping allowing the network to minimize image dissimilarity. To reconstruct fine details while also capturing large texture-less areas, the real-time active stereo system 100 may start at low resolution and hierarchically upsample predictions to higher resolution. At each resolution, matches from the initialization engine are provided to facilitate recovery of thin structures that cannot be represented at low resolution. In some examples, the real-time active stereo system 100 is able to recover very accurate boundaries, fine details and thin structures. To summarize, the real-time active stereo system 100 may include a fast multi-resolution initialization step that is able to compute high resolution matches using learned features, an efficient 2D disparity propagation stage that makes use of slanted support windows with learned descriptors, and state-of-art results in popular benchmarks using a fraction of the computation compared to other methods.

Method

The real-time active stereo system 100 may extract compact feature representations, where a high resolution disparity initialization step utilizes these features to retrieve feasible hypotheses. Also, the real-time active stereo system 100 provides an efficient propagation step that refines the estimates using slanted support windows. The disparity map may be represented as planar tiles at various resolutions, and a learnable feature vector is attached to each tile hypothesis. This allows the network to learn which information about a small part of the disparity map that is relevant to further improving the result. This can be interpreted as an efficient and sparse version of the learnable 3D cost volumes that have shown to be beneficial.

In some examples, the feature extractor 116 includes a small U-Net (e.g., a very small U-Net), where the multi-resolution features of the decoder are used by the rest of the pipelines. These features encode multi-scale details of the image. Once the features are extracted, the initialization engine 120 initializes disparity maps as fronto-parallel tiles at multiple resolutions. For example, the matching engine 122 evaluates multiple hypotheses and selects the one with the lowest $\ell_1$ distance between left and right view feature. Additionally, a compact per-tile descriptor (e.g., a feature descriptor 144) is computed using a small network (e.g., the neural network 169). The output of the initialization engine 120 is then passed to a propagation engine 126, which acts similarly to the approximated Conditional Random Field solution. This stage (e.g., propagation stage) hierarchically refines the tile hypotheses in an iterative fashion.

Tile Hypothesis

A tile hypothesis (e.g., a plane hypothesis 141) is defined as a planar patch with a learnable feature attached to it. For example, a tile hypothesis includes a geometric part describing a slanted plane with the disparity d (e.g., disparity 142) and the gradient of disparity in x and y directions ($d_x$, $d_y$), and a learnable part p (e.g., a feature descriptor 144). The hypothesis is therefore described as a vector which encodes a slanted 3D plane, such as:

$$h = [d, d_x, d_y, p],\quad \text{Eq. (1)}$$

where d, $d_x$, $d_y$ is the plane (e.g., slanted plane), and p is the tile feature descriptor (e.g., the feature descriptor 144). The tile feature descriptor is a learned representation of the tile (e.g., region 145) which allows the network to attach additional information to the tile. This could for example be matching quality or local surface properties such as how planar the geometry actually is. The information for the feature descriptor 144 may not be constrained, but rather learned (end-to-end) from the data instead.

Feature Extractor

The feature extractor 116 provides a set of multi-scale feature maps $\varepsilon = \{e_0, \ldots e_M\}$ (e.g., multi-scale features 118-1, multi-scale features 118-2) that are used for initial matching and for warping in the propagation stage. A feature map may be denoted as $e_l$ and an embedding vector $e_{l,x,y}$ for locations x, y at resolution $l \in 0, \ldots, M$, where 0 is the original image resolution and M denotes a $2^M \times 2^M$ downsampled resolution.

A single embedding vector $e_{l,x,y}$ includes multiple feature channels. The feature extractor 116 ($\varepsilon = \mathcal{F}(I; \theta_\mathcal{F})$) may be implemented as a U-Net like architecture, e.g., an encoder-decoder with skip connections, with learnable parameters $\theta_\mathcal{F}$. The network may include strided convolutions and transposed convolutions with leaky ReLUs as non-linearities. The set of feature maps E that is used in the remainder of the network are the outputs of the upsampling part of the U-Net at all resolutions. This means that even the high resolution features do contain some amount of spatial context. In some examples, one down-sampling block of the U-Net has a single 3×3 convolution followed by a 2×2 convolution with stride 2. In some examples, one up-sampling block applies 2×2 stride 2 transpose convolutions to upsample results of coarser U-Net resolution. Features are concatenated with a skip connection, and a 1×1 convolution followed by a 3×3 convolution are applied to merge the skipped and upsampled feature for the current resolution. Each up-sampling block generates a feature map $e_l$, which is then used for downstream tasks and also further upsampled in the U-Net to generate a higher resolution feature map. The feature extractor 116 is executed on the left and the right image and obtain two multi-scale representations $\varepsilon^L$ and $\varepsilon^R$ (e.g., multi-scale features 118-1, multi-scale features 118-2).

Initialization

The initialization engine 120 is configured to extract an initial disparity $d^{init}$ (e.g., disparity 142) and a feature vector $p^{init}$ (e.g., feature descriptor 144) for each tile (e.g., region 145) at various resolutions. The output of the initialization engine 120 may be fronto-parallel tile hypotheses (e.g., plane hypotheses 141) of the form $h^{init} = [d^{init}, 0, 0, p^{init}]$.

Tile Disparity

In order to keep the initial disparity resolution high, overlapping tiles are used along the x direction (e.g., the width) in the right (secondary) image, and non-overlapping tiles are used along the x direction in the left (reference) image for efficient matching. To extract the tile features (e.g., per-region features 166L/166R), a 4×4 convolution is run on each extracted feature map $e_l$. The strides for the left (reference) image and the right (secondary) image are different to facilitate the aforementioned overlapping tiles. For the left image, strides of 4×4 are used. For the right image, strides of 4×1 are used. The different amounts of strides used for the left image and the right image may enable full disparity resolution to maximize accuracy. In some examples, this convolution is followed by a leaky ReLU and a 1×1 convolution.

The output of this step will be a new set of feature $\tilde{\varepsilon} = \{\tilde{e}_0, \ldots, \tilde{e}_m\}$ with per tile features $\tilde{e}_{l,x,y}$. Note that the width of the feature maps $\varepsilon^L$ and (e.g., per-region features 166L and per-region features 166R) are now different. The per-tile features are explicitly matched along the scan lines. The matching cost $\varrho$ at location (x,y) and resolution l with disparity d are defined as:

$$\varrho(l,x,y,d) = \|\tilde{e}_{l,x,y}^L - \tilde{e}_{l,4x-d,y}^R\|_1 \quad \text{Eq. (2):}$$

The initial disparities (e.g., disparities 142) are then computed as:

$$d_{l,x,y}^{init} = \arg\min_{d \in [0,D]} \varrho(l,x,y,d), \quad \text{Eq. (3):}$$

for each (x,y) location and resolution l, where D is the maximal disparity that is considered. Note that despite the fact that the initialization stage exhaustively computes matches for all disparities there may not be a need to store the whole cost volume. At test time, only the location of the best match may need to be extracted, which can be done very efficiently utilizing fast memory, e.g. shared memory on GPUs and a fused implementation in a single Op. Therefore, in some examples, there is no need to store and process a 3D cost volume.

Tile Feature Descriptor

The initialization engine 120 also predicts a feature description $p_{l,x,y}^{init}$ (e.g., feature descriptor 144) for each (x,y) location and resolution l as follows:

$$P_{l,x,y}^{init} = \mathcal{D}(\varrho(d_{l,x,y}^{init}), \tilde{e}_{l,x,y}^L; \theta \mathcal{D}_i). \quad \text{Eq. (4):}$$

The features are based on the embedding vector of the reference image $\tilde{e}_{l,x,y}^L$ and the costs $\varrho$ of the best matching disparity $d_{init}$. A perceptron $\mathcal{D}$, with learnable weights $\theta_\mathcal{D}$ are utilized, which is implemented with a 1×1 convolution followed by a leaky ReLU. The input to the tile feature descriptor (e.g., feature descriptor 144) includes the matching costs $\varrho(\cdot)$, which allows the network to get a sense of the confidence of the match.

Propagation

The propagation engine 126 receives the tile hypotheses (e.g., initial depth estimations 124) as input and outputs refined tile hypotheses based on spatial propagation of information and fusion of information. The propagation engine 126 may internally warp the features from the feature extractor 116 from the right image (secondary) to the left image (reference) in order to predict highly accurate offsets to the input tiles. An additional confidence (e.g., confidence value 180) is predicted which allows for effective fusion between hypotheses coming from earlier propagation layers and from the initialization engine 120.

Warping

The warping step computes the matching costs between the feature maps $e_l^L$ and $e_l^R$ at the feature resolution l associated with the tiles. This step is used to build a local cost volume 176 around the current hypothesis. Each tile hypothesis is converted into a planar patch of size 4×4 that it originally covered in the feature map. The corresponding 4×4 local disparity map is denoted as d with:

$$d'_{i,j} = d + (i-1.5)d_x + (j-1.5)d_y, \quad \text{Eq. (5):}$$

for patch coordinates $i,j \in \{0, \ldots, 3\}$. The local disparities are then used to warp the features $e_l^R$ from the right (secondary) image to the left (reference) image using linear interpolation along the scan lines. This results in a warped feature representation e which should be very similar to the corresponding features of the left (reference) image $e_l^R$ if the local disparity maps d are accurate. Comparing the features of the reference (x,y) tile with the warped secondary tile, the cost vector $\phi(e,d) \in \mathbb{R}^6$ is defined as:

$$\phi(e_l, d') = [c_{0,0}, c_{0,1}, \ldots, c_{0,3}, c_{1,0} \ldots c_{3,3}], \text{ where} \quad \text{Eq. (6)}$$

$$c_{i,j} = \left\| e_{l,4x+i,4y+j}^L - e_{l,4x+i-d'_{i,j},4y+j}^R \right\|_1.$$

Tile Update Prediction

This step takes n tile hypotheses as input and predicts deltas for the tile hypotheses plus a scalar value w (e.g., a confidence value 180) for each tile indicating how likely this tile is to be correct, i.e. a confidence measure. This mechanism is implemented as a CNN module $\mathcal{U}$ (e.g., CNN module 178), where the convolutional architecture allows the network to see the tile hypotheses in a spatial neighborhood and hence is able to spatially propagate information. Also, the tile update prediction includes augmenting the tile hypothesis with the matching costs $\phi$ from the warping step. By doing this for a small neighborhood in disparity space, a local cost volume 176 is constructed, which allows the network to refine the tile hypotheses effectively. For example, all the disparities in a tile may be displaced by a constant offset of one disparity 1 in the positive and negative directions and the cost is computed three times. Using this, let a be the augmented tile hypothesis map for input tile map h:

$$a_{l,x,y} = \left[h_{l,x,y}, \underbrace{\phi(e_l, d'-1), \phi(e_l, d'), \phi(e_l, d'+1)}_{\text{local cost volume}}\right], \quad \text{Eq. (7)}$$

For a location (x,y) and resolution l, the CNN module $\mathcal{U}_l$ then predicts updates for each of the n tile hypothesis maps and additionally $\omega^i \in \mathbb{R}$, which represent the confidence of the tile hypotheses:

$$\underbrace{(\Delta h_l^1, w^1, \ldots, \Delta h_l^n, w^n)}_{\text{hypotheses updates}} = \mathcal{U}_l(a_l^1, \ldots, a_l^n; \theta_{u_l}). \quad \text{Eq. (8)}$$

The architecture $\mathcal{U}$ is implemented with residual blocks 182 but without batch normalization. Dilated convolutions are used to increase the receptive field. Before running a sequence of residual blocks 182 with varying dilation factors, a 1×1 convolution followed by a leaky ReLU are executed to decrease the number of feature channels. The update prediction engine 128 is applied in a hierarchical iterative fashion. At the lowest resolution l=M, 1 tile hypothesis per location is provided from the initialization stage, hence n=1. The tile updates are applied by summing the input tile hypotheses and the deltas and upsample the tiles by a factor of 2 in each direction. Thereby, the disparity d is upsampled using the plane equation of the tile and the remaining parts of the tile hypothesis $d_x$, $d_y$ and p are upsampled using nearest neighbor sampling. At the next resolution M−1, two hypotheses are provided (e.g., the one from the initialization stage and the upsampled hypotheses from the lower resolution), hence n=2. The parameter $\omega^i$ is used to select the updated tile hypothesis with highest confidence for each location. This procedure is iterated until the resolution 0 is reached. To further refine the disparity map, the tile size is decreased by a factor of 2×2 and full resolution features are assigned to the tiles. The propagation module is executed using n=1 until tile size 1×1 is reached, which is the final prediction.

Loss Functions

The details of the loss functions to train the depth sensing computing system 104 are provided below. The losses rely on the ground truth disparities $d^{gt}$. To compute them at multiple resolutions, the ground truth disparity maps are max-pooled to downsample them to the required resolution.

Initialization Loss:

Ground truth disparities are given as floating point disparities with subpixel precision, however matching in initialization happens with integer disparities. Therefore, the matching cost for subpixel disparities are computed using linear interpolation. The cost for subpixel disparities is then given as:

$$\psi(d)=(d-\lfloor d \rfloor)\varrho(\lfloor d \rfloor+1)+(\lfloor d \rfloor+1-d)\varrho(\lfloor d \rfloor), \quad \text{Eq. (9):}$$

The l, x, y subscripts are dropped for clarity. The features ε are trained to be such that the matching cost ψ is smallest at the ground truth disparity and larger everywhere else. To achieve this, an $\ell_1$ contrastive loss is imposed:

$$L^{init}(d^{gt},d^{nm})=\psi(d^{gt})+\max(\beta-\psi(d^{nm}),0), \quad \text{Eq. (10):}$$

where >0 is a margin, $d^{gt}$ the ground truth disparity for a specific location, and:

$$d^{nm}=\operatorname{argmin}_{d \in [0,D]/\{d:d \in [d^{gt}-1.5,d^{gt}+1.5]\}}\varrho(d) \quad \text{Eq. (11)}$$

The disparity of the lowest cost non-match for the same location. This cost pushes the ground truth cost toward 0 as well as the lowest cost non-match toward a certain margin. In experiments, the margin may be set to β=1. Similar contrastive losses have been used to learn the matching score in earlier deep learning based approaches to stereo matching. However, they either used a random non-matching location as a negative sample or used all the non-matching locations as negative samples, respectively.

Propagation Loss

During propagation, a loss on the tile geometry d, $d_x$, $d_y$ and the tile confidence ω is imposed. The ground truth disparity $d^{gt}$ and ground truth disparity gradients $d_x^{gt}$ and $d_y^{gt}$ are used, which are computed by robustly fitting a plane to $d^{gt}$ in a 9×9 window centered at the pixel. In order to apply the loss on the tile geometry, the tiles are expanded to a full resolution disparities $\hat{d}$ using the plane equation (d, $d_x$, $d_y$) analogously to Eq. 5. The general robust loss function ρ(•) is used, which resembles a smooth $\ell_1$ loss, e.g., Huber loss. Additionally, a truncation is applied to the loss with threshold A:

$$L^{prop}(d,d_x,d_y)=\min(\rho(d^{diff}),A), \text{ where } d^{diff}=d^{gt}-\hat{d}. \quad \text{Eq. (12):}$$

Further, a loss on the surface slant is imposed, as:

$$L^{slant}(d_x, d_y) = \left\| \begin{matrix} d_x^{gt} - d_x \\ d_y^{gt} - d_y \end{matrix} \right\|_1 \chi_{|d^{diff}| < B}, \quad \text{Eq. (13)}$$

where X is an indicator function which evaluates to 1 when the condition is satisfied and 0 otherwise. To supervise the confidence ω, a loss is imposed, which increases the confidence if the predicted hypothesis is closer than a threshold $C_1$ from the ground truth and decrease the confidence if the predicted hypothesis is further than a threshold $C_1$ away from the ground truth:

$$L^w(w)=\max(1-w,0)\chi_{|d^{diff}|<C_1}+\max(w,0)\chi_{|d^{diff}|>C_2} \quad \text{Eq. (14):}$$

Global Loss:

The network is trained end-to-end utilizing all these losses as a weighted sum over all the scales and pixels: $\Sigma_{l,x,y}\lambda^{init}L_l^{init}+\lambda^{prop}L_l^{prop}+\lambda^{slant}L_l^{slant}+\lambda^w L_l^w$, with hyperparameters λ=1 in some experiments.

As discussed above, a real-time end-to-end architecture is provided for accurate stereo matching. The architecture includes a fast initialization step that is able to compute high resolution matches using learned features efficiently (e.g., very efficiency). These tile initializations are then fused using propagation and fusion steps. The use of slanted support windows with learned descriptors provides additional accuracy.

Although the disclosed inventive concepts include those defined in the attached claims, it should be understood that the inventive concepts can also be defined in accordance with the following examples:

Example 1 is a real-time active stereo system including a capture system configured to capture stereo data, where the stereo data includes a first input image and a second input image, and a depth sensing computing system configured to predict a depth map. The depth sensing computing system includes a feature extractor configured to extract features from the first and second images at a plurality of resolutions, an initialization engine configured to generate a plurality of depth estimations, where each of the plurality of depth estimations corresponds to a different resolution, and a propagation engine configured to iteratively refine the plurality of depth estimations based on image warping and spatial propagation.

Example 2 is the real-time active stereo system of Example 1, wherein the initialization engine is configured to predict a first depth estimation based on a matching of the features from the first and second images at the first resolution.

Example 3 is the real-time active stereo system of any of Examples 1 through 2, wherein the initialization engine is configured to predict a second depth estimation based on a matching of the features from the first and second images at the second resolution.

Example 4 is the real-time active stereo system of any of Examples 1 through 3, wherein the propagation engine is configured to predict, via a first iteration, a refined first depth estimation using the first depth estimation from the initialization engine and the extracted features at the first resolution from the feature extractor.

Example 5 is the real-time active stereo system of any of Examples 1 through 4, wherein the propagation engine is configured to predict, via a second iteration, a refined second depth estimation based on the refined first depth estimation from the first iteration, and the second depth estimation from the initialization engine, where the refined second depth estimation is used in a subsequent iteration or as a basis for the depth map.

Example 6 is the real-time active stereo system of any of Examples 1 through 5, wherein the initialization engine includes a region feature extractor configured to extract first per-region features using the features from the first image and extract second per-region features using the features from the second image.

Example 7 is the real-time active stereo system of any of Examples 1 through 6, wherein the initialization engine includes a matching engine configured to generate a depth estimation based on a matching of the first per-region features with the per-region features.

Example 8 is the real-time active stereo system of any of Examples 1 through 7, wherein the depth estimation includes an initial disparity, a slanted plane, and a feature descriptor for each image region of the depth map.

Example 9 is the real-time active stereo system of any of Examples 1 through 8, wherein the real-time active stereo system may include a neural network configured to generate the feature descriptor based on costs per region that have been generated based on the matching and at least one of the first per-region features or the second per-region features.

Example 10 is the real-time active stereo system of any of Examples 1 through 9, wherein the propagation engine includes a warping module configured to warp the features of the first input image using a depth estimation received from the initialization engine.

Example 11 is the real-time active stereo system of any of Examples 1 through 10, wherein the propagation engine includes a matching engine configured to compute a local cost volume based on a matching of the warp features with the features from the second input image.

Example 12 is the real-time active stereo system of any of Examples 1 through 11, wherein the propagation engine includes a convolutional neural network (CNN) module configured to generate a refined depth estimation based on plane hypotheses of the depth estimation and the local cost volume.

Example 13 is the real-time active stereo system of any of Examples 1 through 12, wherein the CNN module includes one or more residual blocks configured to apply one or more dilation convolutions.

Example 14 is a method that includes operations of the real-time active stereo system of any of Examples 1 through 13.

Example 15 is a computer storage medium encoded with a computer program, the program comprising instructions that are operable, when executed by data processing apparatus, to cause the data processing apparatus to perform the operations of the real-time active stereo system of any of Examples 1 through 13.

Example 16 is a non-transitory computer-readable medium storing executable instructions that when executed by at least one processor are configured to cause the at least one processor to perform any of the operations of the real-time active stereo system of Examples 1 through 13.

Example 17 is a method for real-time stereo matching includes extracting, by a feature extractor, features from first and second images at a plurality of resolutions including a first resolution and a second resolution, and generating, by an initialization engine, a plurality of depth estimations at the plurality of resolutions, including predicting a first depth estimation based on a matching of the features from the first and second images at the first resolution, and predicting a second depth estimation based on a matching of the features from the first and second images at the second resolution. The method includes iteratively refining, by a propagation engine, the plurality of depth estimations based on image warping and spatial propagation, including predicting, via a first iteration, a refined first depth estimation using the first depth estimation and the extracted features at the first resolution, and predicting, via a second iteration, a refined second depth estimation based on the refined first depth estimation from the first iteration and the second depth estimation, where the refined second depth estimation is used in a subsequent iteration or as a basis for a depth map.

Example 18 is the method of Example 17, wherein the first depth estimation includes an initial disparity, a slanted plane, and a feature descriptor for each image region of the depth map.

Example 19 is the method of any of Examples 17 through 18, wherein the predicting the first depth estimation includes extracting, by at least one first convolutional block, first per-region features for each image region using the features of the first image at the first resolution.

Example 20 is the method of any of Examples 17 through 19, wherein the method further includes extracting, by at least one second convolutional block, second per-region features for each image region using the features of the second image at the first resolution.

Example 21 is the method of any of Examples 17 through 20, wherein the method includes selecting, by a matching engine, a slanted plane hypothesis for each region based on costs per region, the slanted plane hypothesis for a particular region including a disparity with a lowest cost.

Example 22 is the method of any of Examples 17 through 21, wherein the method includes constructing a three-dimensional (3D) cost volume based on the costs per region.

Example 23 is the method of any of Examples 17 through 22, wherein the 3D cost volume is not stored or used by the propagation engine.

Example 24 is the method of any of Examples 17 through 23, wherein the slanted plane hypothesis includes a feature descriptor.

Example 25 is the method of any of Examples 17 through 24, wherein the method includes generating, by a neural network, the feature descriptor based on the costs per region and at least one of the first per-region features or the second per-region features.

Example 26 is the method of any of Examples 17 through 25, wherein the at least one first convolutional block may include a convolutional block having a stride value that is different from a convolutional block of the at least one second convolutional block.

Example 27 is the method of any of Examples 17 through 26, wherein the predicting the refined first depth estimation may include warping the features from the first image at the first resolution using the first depth estimation to derive warped features.

Example 28 is the method of any of Examples 17 through 27, wherein the method includes computing a local cost volume based on a matching of the warped features with the features of the second image at the first resolution.

Example 29 is the method of any of Examples 17 through 28, wherein the method includes obtaining an augmented depth estimation based on the local cost volume and the first depth estimation.

Example 30 is the method of any of Examples 17 through 29, wherein the method includes predicting, by a convolution neural network (CNN) module, the refined first depth estimation using the augmented depth estimation.

Example 31 is the method of any of Examples 17 through 30, wherein the method includes displacing disparities in a region by an offset value.

Example 32 is the method of any of Examples 17 through 31, wherein the method includes computing costs for the region multiple times.

Example 33 is the method of any of Examples 17 through 32, wherein the CNN module may include a plurality of residual blocks including a first residual block and a second residual block, where at least one of the first residual block or the second residual block defines one or more dilated convolutions.

Example 34 is the method of any of Examples 17 through 33, wherein the predicting the refined second depth estimation may include upscaling the refined first depth estimation to the second resolution, the refined first depth estimation including a first plane hypothesis for an image region.

Example 35 is the method of any of Examples 17 through 34, wherein the method includes predicting a refined first slanted plane hypothesis and a first confidence value for the image region using the upscaled refined first depth estimation.

Example 36 is the method of any of Examples 17 through 35, wherein the method includes predicting a refined second plane hypothesis and a second confidence value for the image region using the second depth estimation.

Example 37 is the method of any of Examples 17 through 36, wherein the method includes selecting the refined second plane hypothesis for the image region in response to the second confidence value being greater than the first confidence value.

Example 38 is a computer storage medium encoded with a computer program, the program comprising instructions that are operable, when executed by data processing apparatus, to cause the data processing apparatus to perform any of the Examples 17 through 37.

Example 39 is a non-transitory computer-readable medium storing executable instructions that when executed by at least one processor are configured to cause the at least one processor to perform any of the Examples 17 through 37.

Example 40 is a real-time active stereo system configured to perform any of the Examples 17 through 37.

Example 41 is a non-transitory computer-readable medium storing executable instructions that when executed by at least one processor cause the at least one processor to receive a first image captured from a first camera and a second image captured from a second camera, extract features from the first and second images at a plurality of resolutions including a first resolution and a second resolution, generate a plurality of depth estimations at the plurality of resolutions using the extracted features, the plurality of depth estimations including a first depth estimation and a second depth estimation, and iteratively refine the depth estimations based on image warping and spatial propagation, including predict, via a first iteration, a refined first depth estimation using the first depth estimation and the extracted features at the first resolution, and predict, via a second iteration, a refined second depth estimation based on the refined first depth estimation from the first iteration, and the second depth estimation, where the refined second depth estimation is used in a subsequent iteration or as a basis for a depth map.

Example 42 is the non-transitory computer-readable medium of Example 41, wherein the first depth estimation includes an initial disparity, a slanted plane, and a feature descriptor for each image region of the depth map.

Example 43 is a method for real-time stereo matching of any of Examples 41 through 42.

Example 44 is a real-time active stereo system configured to perform any of the Examples 41 through 42.

Figure 12:
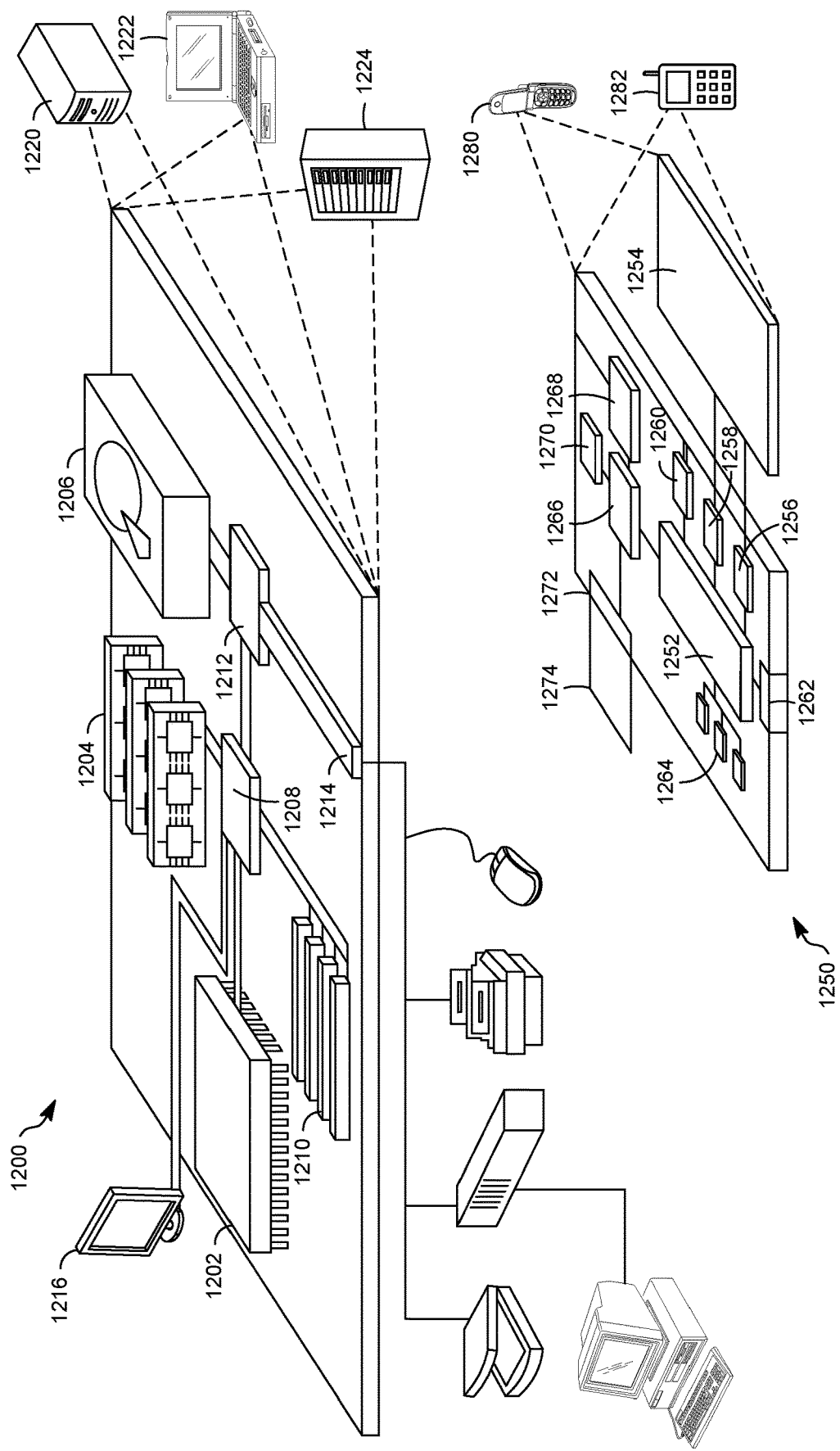
FIG. 12 shows an example of a computer device and a mobile computer device according to an aspect.

FIG. 12 shows an example of a computer device 1200 and a mobile computer device 1250, which may be used with the techniques described here. Computing device 1200 is intended to represent various forms of digital computers, such as laptops, desktops, workstations, personal digital assistants, servers, blade servers, mainframes, and other appropriate computers. Computing device 1250 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1200 includes a processor 1202, memory 1204, a storage device 1206, a high-speed interface 1208 connecting to memory 1204 and high-speed expansion ports 1210, and a low speed interface 1212 connecting to low speed bus 1214 and storage device 1206. Each of the components 1202, 1204, 1206, 1208, 1210, and 1212, are interconnected using various busses, and may be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as display 1216 coupled to high speed interface 1208. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1204 stores information within the computing device 1200. In one implementation, the memory 1204 is a volatile memory unit or units. In another implementation, the memory 1204 is a non-volatile memory unit or units. The memory 1204 may also be another form of computer-readable medium, such as a magnetic or optical disk.

The storage device 1206 is capable of providing mass storage for the computing device 1200. In one implementation, the storage device 1206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1204, the storage device 1206, or memory on processor 1202.

The high speed controller 1208 manages bandwidth-intensive operations for the computing device 1200, while the low speed controller 1212 manages lower bandwidth-intensive operations. Such allocation of functions is exemplary only. In one implementation, the high-speed controller 1208 is coupled to memory 1204, display 1216 (e.g., through a graphics processor or accelerator), and to high-speed expansion ports 1210, which may accept various expansion cards (not shown). In the implementation, low-speed controller 1212 is coupled to storage device 1206 and low-speed expansion port 1214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1220, or multiple times in a group of such servers. It may also be implemented as part of a rack server system 1224. In addition, it may be implemented in a personal computer such as a laptop computer 1222. Alternatively, components from computing device 1200 may be combined with other components in a mobile device (not shown), such as device

1250. Each of such devices may contain one or more of computing devices 1200, 1250, and an entire system may be made up of multiple computing devices 1200, 1250 communicating with each other.

Computing device 1250 includes a processor 1252, memory 1264, an input/output device such as a display 1254, a communication interface 1266, and a transceiver 1268, among other components. The device 1250 may also be provided with a storage device, such as a microdrive or other device, to provide additional storage. Each of the components 1250, 1252, 1264, 1254, 1266, and 1268, are interconnected using various buses, and several of the components may be mounted on a common motherboard or in other manners as appropriate.

The processor 1252 can execute instructions within the computing device 1250, including instructions stored in the memory 1264. The processor may be implemented as a chipset of chips that include separate and multiple analog and digital processors. The processor may provide, for example, for coordination of the other components of the device 1250, such as control of user interfaces, applications run by device 1250, and wireless communication by device 1250.

Processor 1252 may communicate with a user through control interface 1258 and display interface 1256 coupled to a display 1254. The display 1254 may be, for example, a TFT LCD (Thin-Film-Transistor Liquid Crystal Display) or an OLED (Organic Light Emitting Diode) display, or other appropriate display technology. The display interface 1256 may comprise appropriate circuitry for driving the display 1254 to present graphical and other information to a user. The control interface 1258 may receive commands from a user and convert them for submission to the processor 1252. In addition, an external interface 1262 may be provided in communication with processor 1252, to enable near area communication of device 1250 with other devices. External interface 1262 may provide, for example, for wired communication in some examples, or for wireless communication in other implementations, and multiple interfaces may also be used.

The memory 1264 stores information within the computing device 1250. The memory 1264 can be implemented as one or more of a computer-readable medium or media, a volatile memory unit or units, or a non-volatile memory unit or units. Expansion memory 1274 may also be provided and connected to device 1250 through expansion interface 1272, which may include, for example, a SIMM (Single In Line Memory Module) card interface. Such expansion memory 1274 may provide extra storage space for device 1250, or may also store applications or other information for device 1250. Specifically, expansion memory 1274 may include instructions to carry out or supplement the processes described above, and may include secure information also. Thus, for example, expansion memory 1274 may be provided as a security module for device 1250, and may be programmed with instructions that permit secure use of device 1250. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1264, expansion memory 1274, or memory on processor 1252, that may be received, for example, over transceiver 1268 or external interface 1262.

Device 1250 may communicate wirelessly through communication interface 1266, which may include digital signal processing circuitry where necessary. Communication interface 1266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1268. In addition, short-range communication may occur, such as using a Bluetooth, Wi-Fi, or other such transceiver (not shown). In addition, GPS (Global Positioning System) receiver module 1270 may provide additional navigation- and location-related wireless data to device 1250, which may be used as appropriate by applications running on device 1250.

Device 1250 may also communicate audibly using audio codec 1260, which may receive spoken information from a user and convert it to usable digital information. Audio codec 1260 may likewise generate audible sound for a user, such as through a speaker, e.g., in a handset of device 1250. Such sound may include sound from voice telephone calls, may include recorded sound (e.g., voice messages, music files, etc.) and may also include sound generated by applications operating on device 1250. The computing device 1250 may be implemented in a number of different forms, as shown in the figure. For example, it may be implemented as a cellular telephone 1280. It may also be implemented as part of a smart phone 1282, personal digital assistant, or other similar mobile device.

In some examples, the real-time active stereo system 100 is included within a three-dimensional telepresence system. The three-dimensional telepresence system may provide a more realistic face-to-face experience than traditional videoconferencing systems without the use of head-mounted displays and 3-D glasses. Videoconferencing and image conferencing systems are some examples of telepresence systems.

Figure 13:
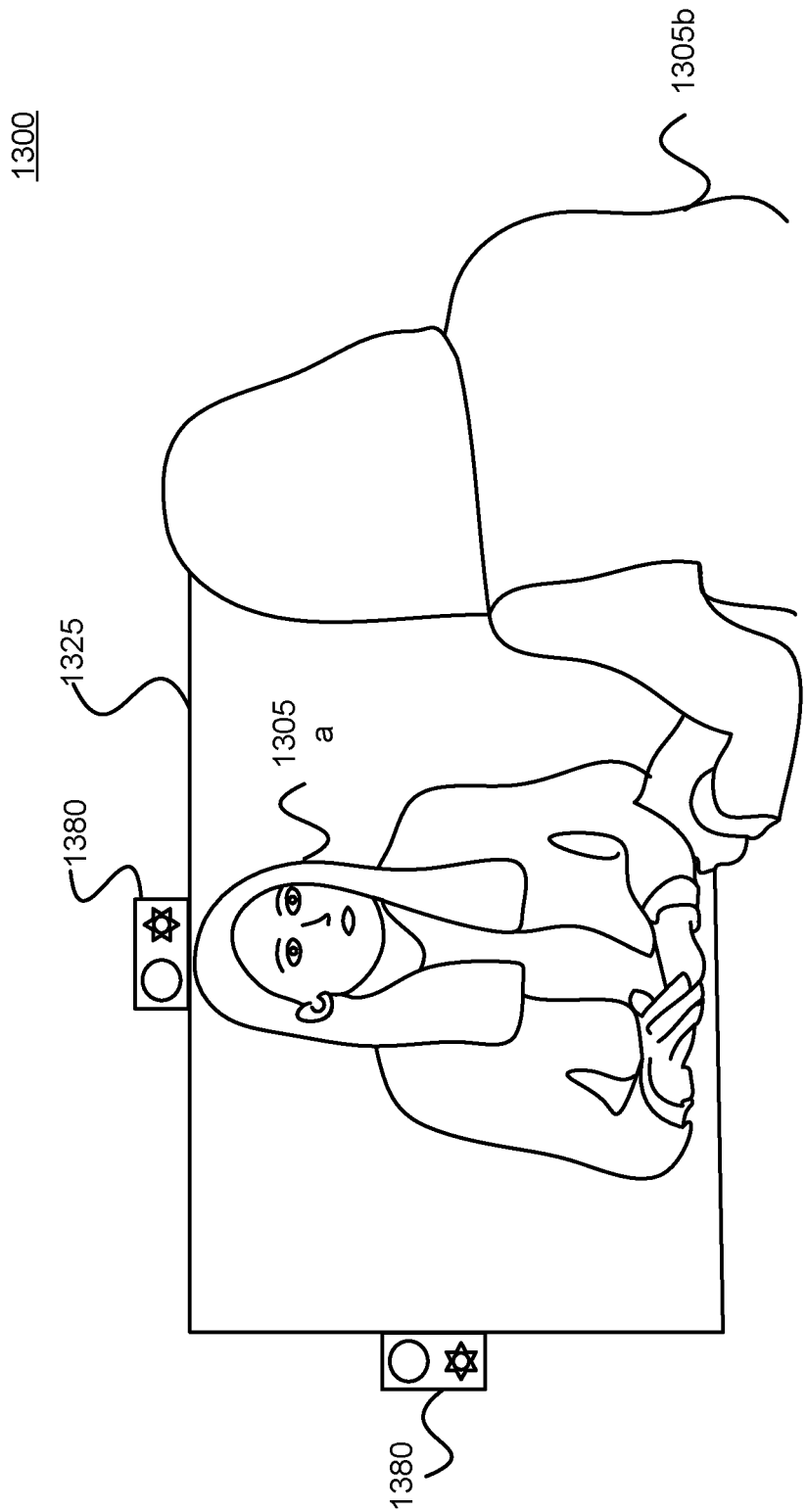
FIG. 13 illustrates a three-dimensional telepresence system according to an aspect.

FIG. 13 illustrates a three-dimensional telepresence system 1300 according to an aspect. The three-dimensional telepresence system 1300 may be configured to execute the depth sensing computing system 104 of FIG. 1 according to the techniques described herein.

Two users 1305*a* and 1305*b* can use the three-dimensional telepresence system 1300 to communicate remotely but still face-to-face. A first user 1305*a* is at a remote location from a second user 1305*b*. The second user 1305*b* sees a three-dimensional graphic image of the first user 1305*a* on a display 1325. In some examples, the display 1325 is at a distance from the second user 1305*b* and of an appropriate size to simulate co-presence of the first user 1305*a* and the second user 1305*b*. For example, the display 1325 may be positioned 1 m across the table from second user 1305*b*, and the display 1325 may be a 1 m display. A camera assembly 1380 can be configured to capture visible light and infrared light (e.g., the stereo data 110 of FIG. 1) which can be used by the three-dimensional telepresence system 1300 (e.g., by the terminal used by second user 1305*b*) to display a three-dimensional stereoscopic image of the second user 1305*b* on a display viewable by first user 1305*a* (which is not shown in FIG. 13). In some examples, the camera assembly 1380 includes the capture system 102 of FIG. 1. In some examples, one or more microphones and/or speakers (e.g., speaker arrays) can be included in the system 1300. In such systems 1300, the microphone(s)

and/or speaker(s) can be used to simulate spatial audio (e.g., sounds being produced spatially dependent on location of origin).

Figure 14:
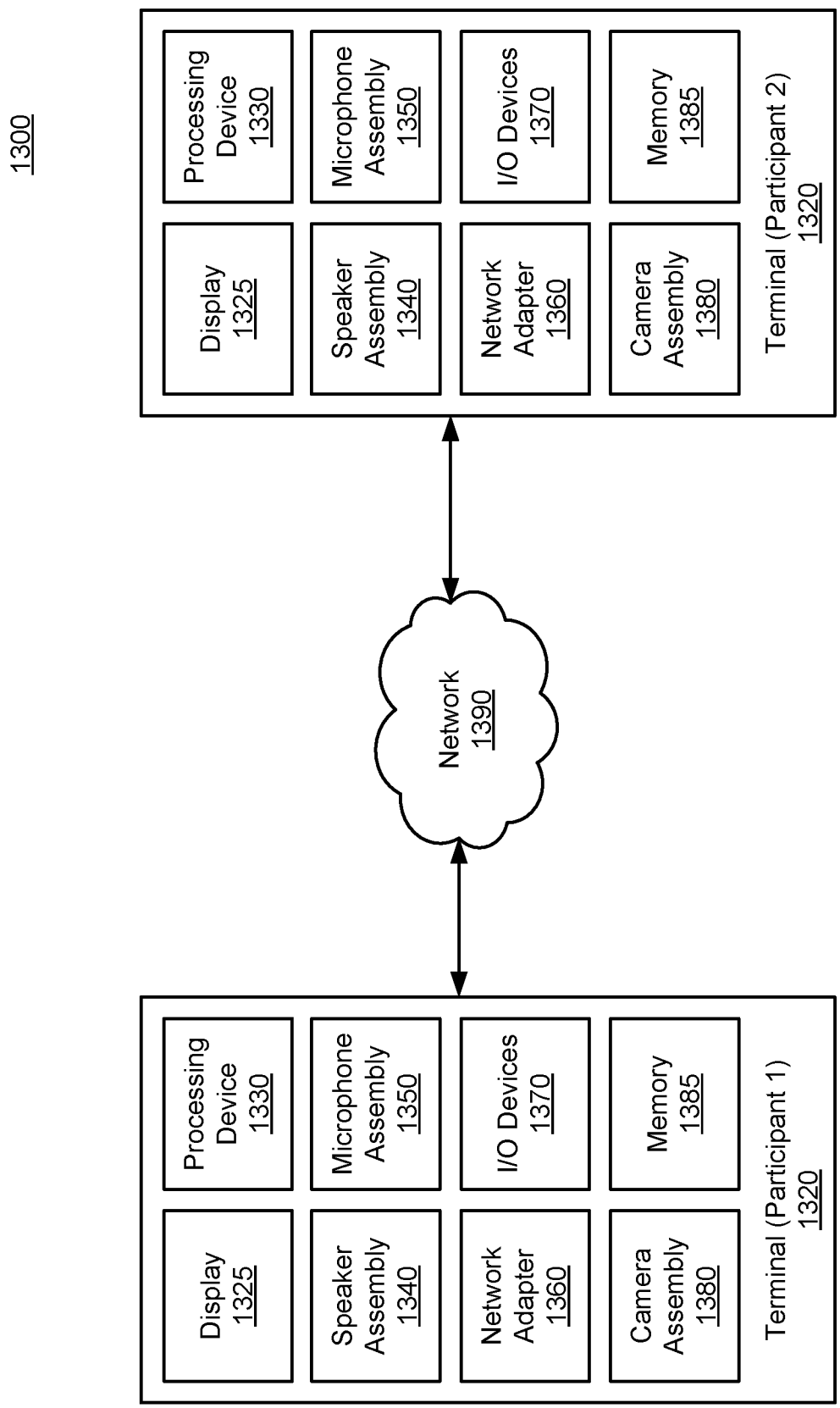
FIG. 14 illustrates, in block form, the three-dimensional telepresence system for conducting three-dimensional video conferencing between two users according to an aspect.

FIG. 14 illustrates, in block form, the three-dimensional telepresence system 1300 for conducting three-dimensional video conferencing between two users according to an aspect. In some examples, each terminal 1320, corresponding to respective users (e.g., a first participant and a second participant) can communicate using a network 1390.

The three-dimensional telepresence system 1300 can be computerized, where each of the illustrated components includes a computing device, or part of a computing device, that is configured to communicate with other computing devices via the network 1390. For example, each terminal 1320 can include one or more computing devices, such as a desktop, notebook, or handheld computing device that is configured to transmit and receive data to/from other computing devices via the network 1390. In some examples, each terminal 1320 may be a special purpose teleconference device where each component of the terminal 1320 is disposed within the same housing. In some examples, communication between each terminal 1320 may be facilitated by one or more servers or computing clusters (not shown) which manage conferencing set-up, tear down, and/or scheduling. In some examples, the terminals 1320 may communicate using point-to-point communication protocols.

The terminal 1320 can be used by participants in a videoconference. In some examples, the participants use identical terminals. For example, each participant may use the same model number of terminal 1320 with the same configuration or specification, or terminals 1320 that have been configured in a similar way to facilitate communication during the video conference. In some examples, terminals used by participants may differ but are each configured to send and receive image and depth data (e.g., the depth maps 129 of FIG. 1) and generate three-dimensional stereoscopic images without the use of head-mounted displays or three-dimensional glasses. For ease of discussion, the example of FIG. 14 presents identical terminals 1320 on both ends of the three-dimensional telepresence system 1300.

The terminal 1320 includes a display 1325, a camera assembly 1380, and a processing device 1330. In some examples, the display 1325 can include a glasses-free lenticular three-dimensional display. The camera assembly 1380 may include the capture system 102 of FIG. 1. The processing device 1330 may include the depth sensing computing system 104 of FIG. 1.

The processing device 1330 may perform functions and operations to command (e.g., trigger) the display 1325 to display images. In some examples, the processing device 1330 may be in communication with the camera assembly 1380 to receive the stereo data 110 of FIG. 1, and the processing device 1330 is configured to execute the depth sensing computing system 104 of FIGS. 1 through 10 based on the stereo image data 110 in order to generate the depth maps 129 according to the techniques discussed herein. The processing device 1330 may also be in communication with a network adapter 1360 to receive image data and depth data (e.g., the depth maps 129 of FIG. 1) from other terminals 1320 participating in a videoconference. The processing device 1330 may use the position and location data received from the camera assembly 1380 and the image data and depth data from the network adapter 1360 to render three-dimensional stereoscopic images on the display 1325. In some examples, the processing device 1330 may compress or encode the image data and/or depth data so that it requires less memory or bandwidth before it communicates the image data or the depth data over the network 1390. Likewise, the processing device 1330 may decompress or decode received image data or depth data before the processing device 1330 renders stereoscopic three-dimensional images.

According to some examples, the terminal 1320 can include a speaker assembly 1340 and a microphone assembly 1350. The speaker assembly 1340 may project audio corresponding to audio data received from other terminals 1320 in a videoconference. The speaker assembly 1340 may include one or more speakers that can be positioned in multiple locations to, for example, project directional audio. The microphone assembly 1350 may capture audio corresponding to a user of the terminal 1320. The microphone assembly 1350 may include one or more speakers that can be positioned in multiple locations to, for example, project directional audio. In some examples, a processing unit (e.g., processing device 1330) may compress or encode audio captured by the microphone assembly 1350 and communicated to other terminals 1320 participating in the videoconference via the network adapter 1360 and the network 1390.

The terminal 1320 can also include I/O devices 1370. The I/O devices 1370 can include input and/or output devices for controlling the videoconference in which the terminal 1320 is participating. For example, the I/O devices 1370 can include buttons or touch screens which can be used to adjust contrast, brightness, or zoom of the display 1325. The I/O devices 1370 can also include a keyboard interface which may be used to annotate images rendered on the display 1325, or annotations to communicate to other terminals 1320 participating in a videoconference.

The terminal 1320 may include memory 1385. The memory 1385 may be a volatile memory unit or units or nonvolatile memory units or units depending on the implementation. The memory 1385 may be any form of computer readable medium such as a magnetic or optical disk, or solid-state memory. The memory 1385 may store instructions that cause the processing device 1330 to perform functions and operations consistent with disclosed examples.

The terminals 1320 of the three-dimensional telepresence system 1300 communicate various forms of data between each other to facilitate videoconferencing. In some examples, the terminals 1320 may communicate image data, depth data (e.g., the depth maps 129), audio data, and/or location data corresponding to each respective user of the terminal 1320. The processing device 1330 of each terminal 1320 may use received image data, depth data, and/or location data to render stereoscopic three-dimensional images on the display 1325. The processing device 1330 can interpret audio data to command the speaker assembly 1340 to project audio corresponding to the audio data. In some examples, the image data, depth data, audio data, and/or location data may be compressed or encoded and the processing device 1330 may perform functions and operations to decompress or decode the data.

Depending on the implementation, the network 1390 can include one or more of any type of network, such as one or more local area networks, wide area networks, personal area networks, telephone networks, and/or the Internet, which can be accessed via any available wired and/or wireless communication protocols. For example, the network 1390 can include an Internet connection through which each terminal 1320 communicates. Any other combination of networks, including secured and unsecured network communication links are contemplated for use in the systems described herein.

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an, and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments are not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A real-time active stereo system comprising:
    a capture system configured to capture stereo data, the stereo data including a first input image and a second input image; and
    a depth sensing computing system configured to predict a depth map, the depth sensing computing system including:
        a feature extractor configured to extract features from the first and second input images at a plurality of resolutions;
        an initialization engine configured to generate a plurality of depth estimations, each of the plurality of depth estimations corresponding to a different resolution and including a three-dimensional (3D) slanted plane hypothesis for a region of a respective depth estimation, the 3D slanted plane hypothesis including a disparity value and a location of a slanted plane; and
        a propagation engine configured to iteratively refine the plurality of depth estimations based on image warping and spatial propagation.

2. The real-time active stereo system of claim 1, wherein the initialization engine is configured to predict a first depth estimation based on a matching of the features from the first and second input images at a first resolution, the initialization engine configured to predict a second depth estimation based on a matching of the features from the first and second input images at a second resolution.

3. The real-time active stereo system of claim 2, wherein the propagation engine is configured to predict, via a first iteration, a refined first depth estimation using the first depth estimation from the initialization engine and the features at the first resolution from the feature extractor, the propagation engine configured to predict, via a second iteration, a refined second depth estimation based on the refined first depth estimation from the first iteration, and the second depth estimation from the initialization engine, the refined second depth estimation being used in a subsequent iteration or as a basis for the depth map.

4. The real-time active stereo system of claim 1, wherein the initialization engine includes a region feature extractor configured to extract first per-region features using features from the first input image and extract second per-region features using features from the second input image, the initialization engine including a matching engine configured to generate a depth estimation based on a matching of the first per-region features with the second per-region features.

5. The real-time active stereo system of claim 1, wherein the 3D slanted plane hypothesis includes a feature descriptor that represents information about the slanted plane.

6. The real-time active stereo system of claim 5, further comprising:
    a neural network configured to generate the feature descriptor based on costs per region.

7. The real-time active stereo system of claim 1, wherein the propagation engine includes a warping module configured to generate warped features by warping features of the first input image using a depth estimation received from the initialization engine, a matching engine configured to compute a local cost volume based on a matching of the warped features with features from the second input image, and a convolutional neural network (CNN) module configured to generate a refined depth estimation based on plane hypotheses of the depth estimation and the local cost volume.

8. The real-time active stereo system of claim 7, wherein the CNN module includes one or more residual blocks configured to apply one or more dilation convolutions.

9. A method for real-time stereo matching comprising:
    extracting, by a feature extractor, features from a first input image and a second input image at a plurality of resolutions including a first resolution and a second resolution; and
    generating, by an initialization engine, a plurality of depth estimations at the plurality of resolutions, including:
        predicting a first depth estimation based on a matching of the features from the first and second input images at the first resolution, the first depth estimation including a three-dimensional (3D) slanted plane hypothesis for each region of a respective depth estimation, the 3D slanted plane hypothesis including a disparity value and a location of a slanted plane; and
        predicting a second depth estimation based on a matching of the features from the first and second input images at the second resolution; and
    iteratively refining, by a propagation engine, the plurality of depth estimations based on image warping and spatial propagation, including:
        predicting, via a first iteration, a refined first depth estimation using the first depth estimation and the features at the first resolution; and
        predicting, via a second iteration, a refined second depth estimation based on the refined first depth estimation from the first iteration and the second depth estimation, the refined second depth estimation being used in a subsequent iteration or as a basis for a depth map.

10. The method of claim 9, wherein the 3D slanted plane hypothesis includes a feature descriptor that represents information about the slanted plane.

11. The method of claim 9, wherein the predicting the first depth estimation includes:

extracting, by at least one first convolutional block, first per-region features for each image region using features of the first input image at the first resolution;

extracting, by at least one second convolutional block, second per-region features for each image region using features of the second input image at the first resolution; and selecting, by a matching engine, the 3D slanted plane hypothesis for each region having a disparity value with a lowest cost.

12. The method of claim 11, further comprising:
constructing a 3D cost volume based on costs per region, wherein the 3D slanted plane hypothesis is selected based on the costs per region, wherein the 3D cost volume is not stored or used by the propagation engine.

13. The method of claim 12, wherein the 3D slanted plane hypothesis includes a feature descriptor that describes information about a slanted plane, further comprising:
generating, by a neural network, the feature descriptor based on the costs per region and at least one of the first per-region features or the second per-region features.

14. The method of claim 11, wherein the at least one first convolutional block includes a convolutional block having a stride value that is different from a convolutional block of the at least one second convolutional block.

15. The method of claim 9, wherein the predicting the refined first depth estimation includes:
generating warped features by warping features from the first input image at the first resolution using the first depth estimation;
computing a local cost volume based on a matching of the warped features with features of the second input image at the first resolution;
obtaining an augmented depth estimation based on the local cost volume and the first depth estimation; and
predicting, by a convolution neural network (CNN) module, the refined first depth estimation using the augmented depth estimation.

16. The method of claim 15, wherein computing the local cost volume includes:
displacing disparities in a respective region by an offset value; and
computing costs for the respective region.

17. The method of claim 15, wherein the CNN module includes a plurality of residual blocks including a first residual block and a second residual block, at least one of the first residual block or the second residual block defining one or more dilated convolutions.

18. The method of claim 9, wherein predicting the refined second depth estimation includes:

generating an upscaled first depth estimation by upscaling the refined first depth estimation to the second resolution;
predicting a refined first slanted plane hypothesis and a first confidence value for an image region using the upscaled first depth estimation;
predicting a refined second slanted plane hypothesis and a second confidence value for the image region using the second depth estimation; and
selecting the refined second slanted plane hypothesis for the image region in response to the second confidence value being greater than the first confidence value.

19. The method of claim 9, wherein the refined second depth estimation is upsampled and refined one or more times without using a depth estimation from the initialization engine until a full resolution is reached.

20. A non-transitory computer-readable medium storing executable instructions that when executed by at least one processor cause the at least one processor to execute operations, the operations comprising:
receiving a first input image captured from a first camera and a second input image captured from a second camera;
extracting features from the first and second input images at a plurality of resolutions including a first resolution and a second resolution;
generating a plurality of depth estimations at the plurality of resolutions using the features, the plurality of depth estimations including a first depth estimation and a second depth estimation, the first depth estimation including a three-dimensional (3D) slanted plane hypothesis for each region of a respective depth estimation, the 3D slanted plane hypothesis including a disparity value and a location of a slanted plane; and
iteratively refining the plurality of depth estimations based on two-dimensional (2D) image warping and spatial propagation, including:
predicting, via a first iteration, a refined first depth estimation using the first depth estimation and the features at the first resolution; and
predicting, via a second iteration, a refined second depth estimation based on the refined first depth estimation from the first iteration, and the second depth estimation, the refined second depth estimation being used in a subsequent iteration or as a basis for a depth map.

21. The non-transitory computer-readable medium of claim 20, wherein the 3D slanted plane hypothesis includes a feature descriptor that represents information about the slanted plane.

* * * * *